(12) United States Patent
Kobayashi et al.

(10) Patent No.: US 7,347,490 B2
(45) Date of Patent: Mar. 25, 2008

(54) VEHICLE FLOOR STRUCTURE AND VEHICLE BODY FRAME STRUCTURE

(75) Inventors: Takeshi Kobayashi, Wako (JP); Toshiyuki Suzuki, Wako (JP); Masahiro Inoue, Wako (JP); Kazushiro Inoue, Wako (JP); Hiroaki Kase, Wako (JP); Yuji Hayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 11/236,348

(22) Filed: Sep. 27, 2005

(65) Prior Publication Data
US 2006/0066136 A1    Mar. 30, 2006

(30) Foreign Application Priority Data

| Sep. 30, 2004 | (JP) | ............................. 2004-289050 |
| Sep. 30, 2004 | (JP) | ............................. 2004-289066 |
| Sep. 30, 2004 | (JP) | ............................. 2004-289150 |
| Sep. 30, 2004 | (JP) | ............................. 2004-289321 |

(51) Int. Cl.
*B62D 25/20* (2006.01)

(52) U.S. Cl. ....................................... 296/204; 296/63

(58) Field of Classification Search ............... 296/37.1, 296/37.14, 204, 193.07, 203.01, 203.03, 296/63; 280/163
See application file for complete search history.

(56) References Cited

U.S. PATENT DOCUMENTS 4,798,400 A * 1/1989 Kosuge ...................... 280/796
5,327,989 A * 7/1994 Furuhashi et al. .......... 180/248

FOREIGN PATENT DOCUMENTS

| JP | 63-20284 | 1/1988 |
| JP | 1-164685 | 6/1989 |

* cited by examiner

*Primary Examiner*—Dennis H. Pedder
*Assistant Examiner*—Melissa A. Black
(74) *Attorney, Agent, or Firm*—Hamre, Schumann, Mueller & Larson, P.C.

(57) ABSTRACT

In a vehicle floor structure, a subsidiary frame is provided between a front frame and a seat frame and at a position higher than a lower frame, for supporting thereon a floor section. Step support frame is provided laterally outwardly of the lower frame, for supporting thereon a boarding step so that the floor section is located at a level higher than the boarding step. Vehicle body frame structure includes, for each of left and ride side sections of the vehicle, a straight vertical frame to which are mounted the respective ones ends of an upper arm, lower arm and cushion unit, and respective mounting sections for the upper arm, lower arm and cushion unit can be provided in linear alignment with one another in the straight vertical frame along the length thereof.

4 Claims, 17 Drawing Sheets

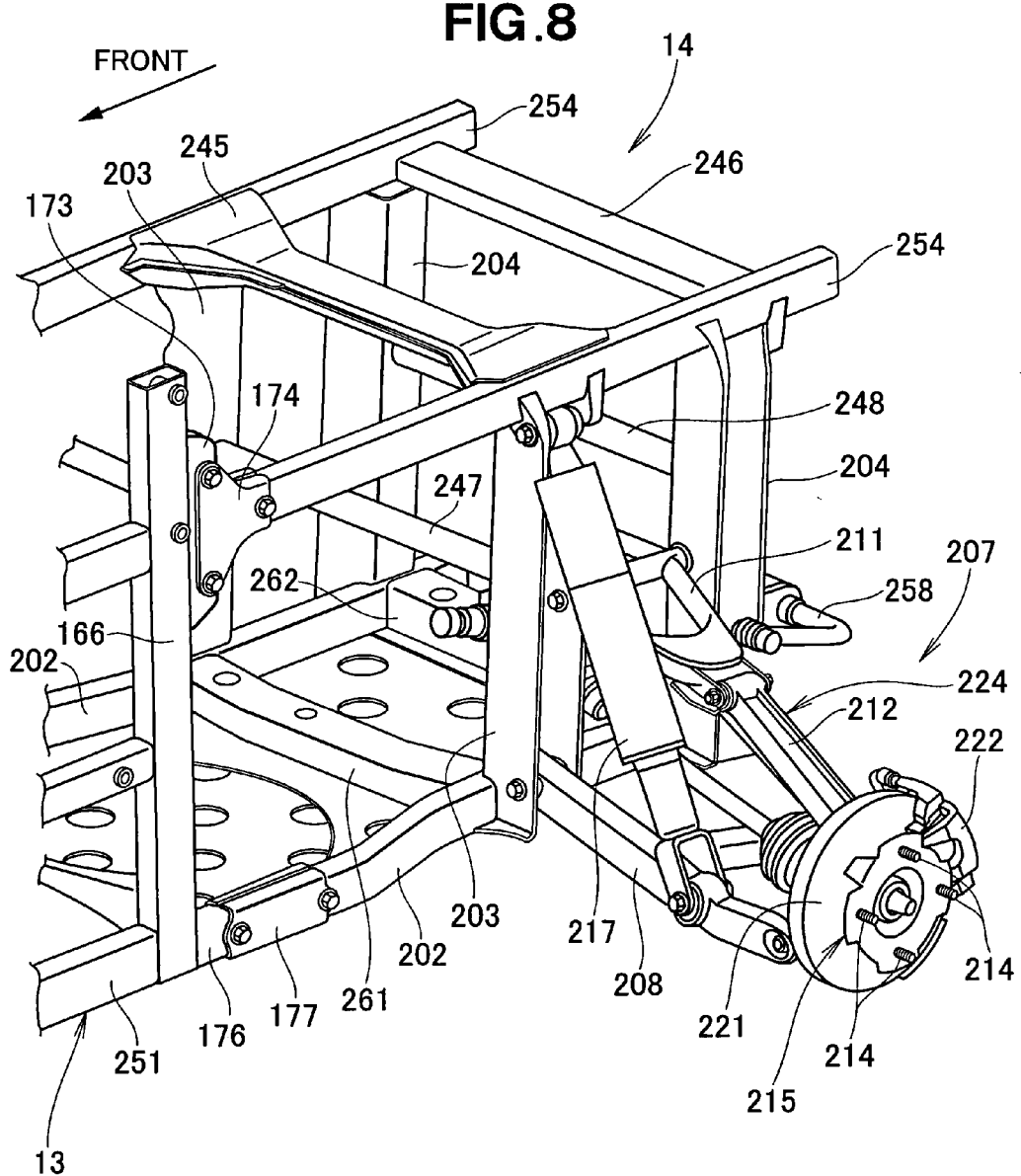

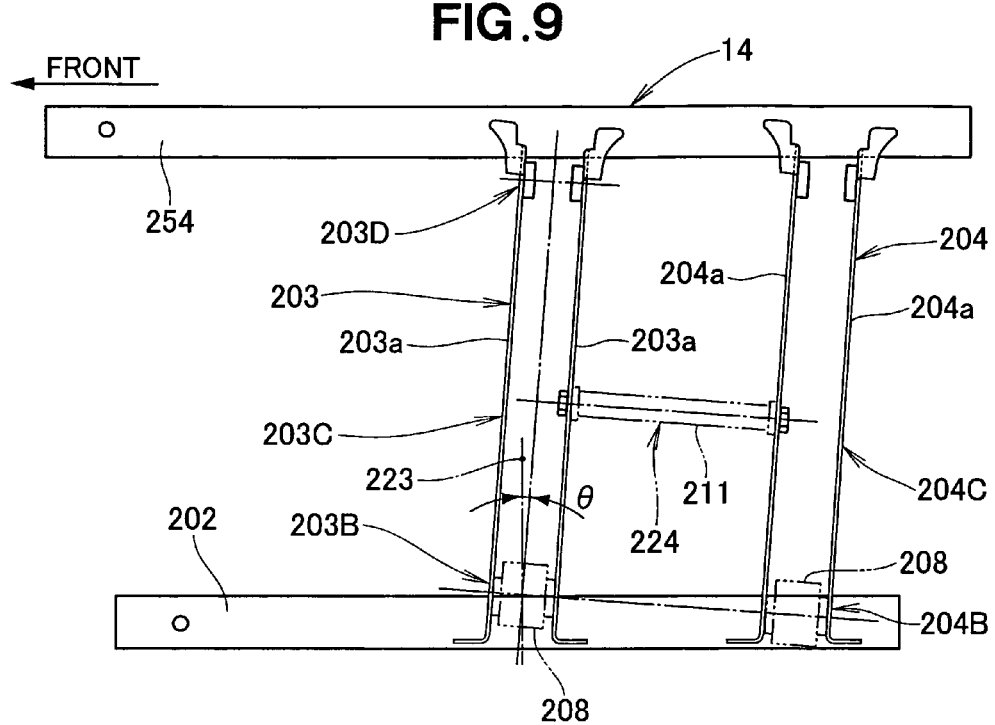
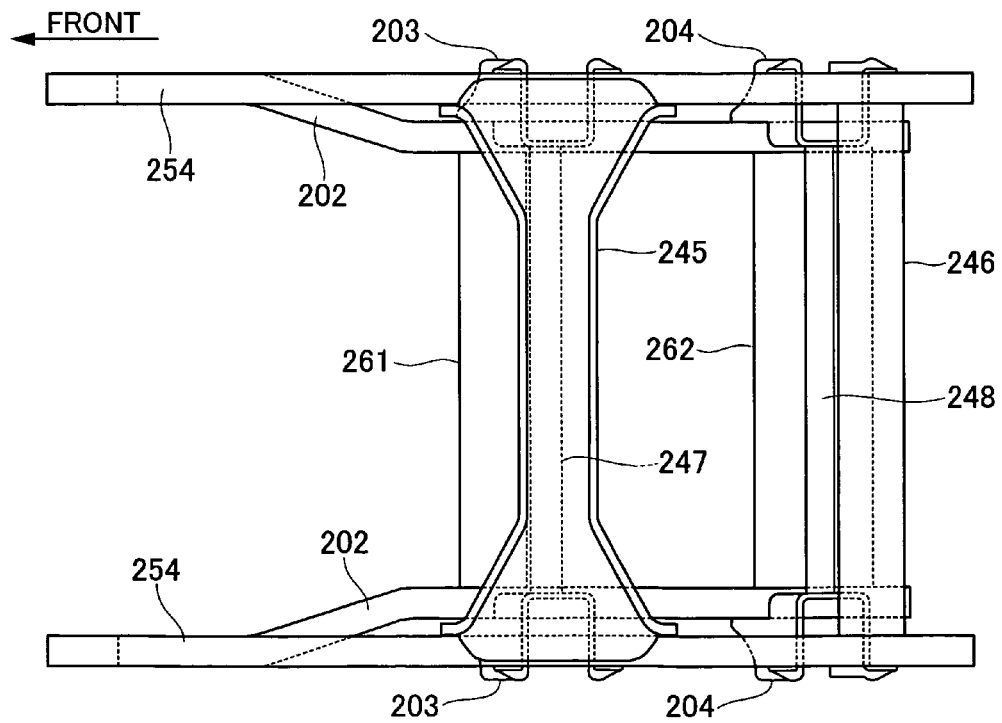

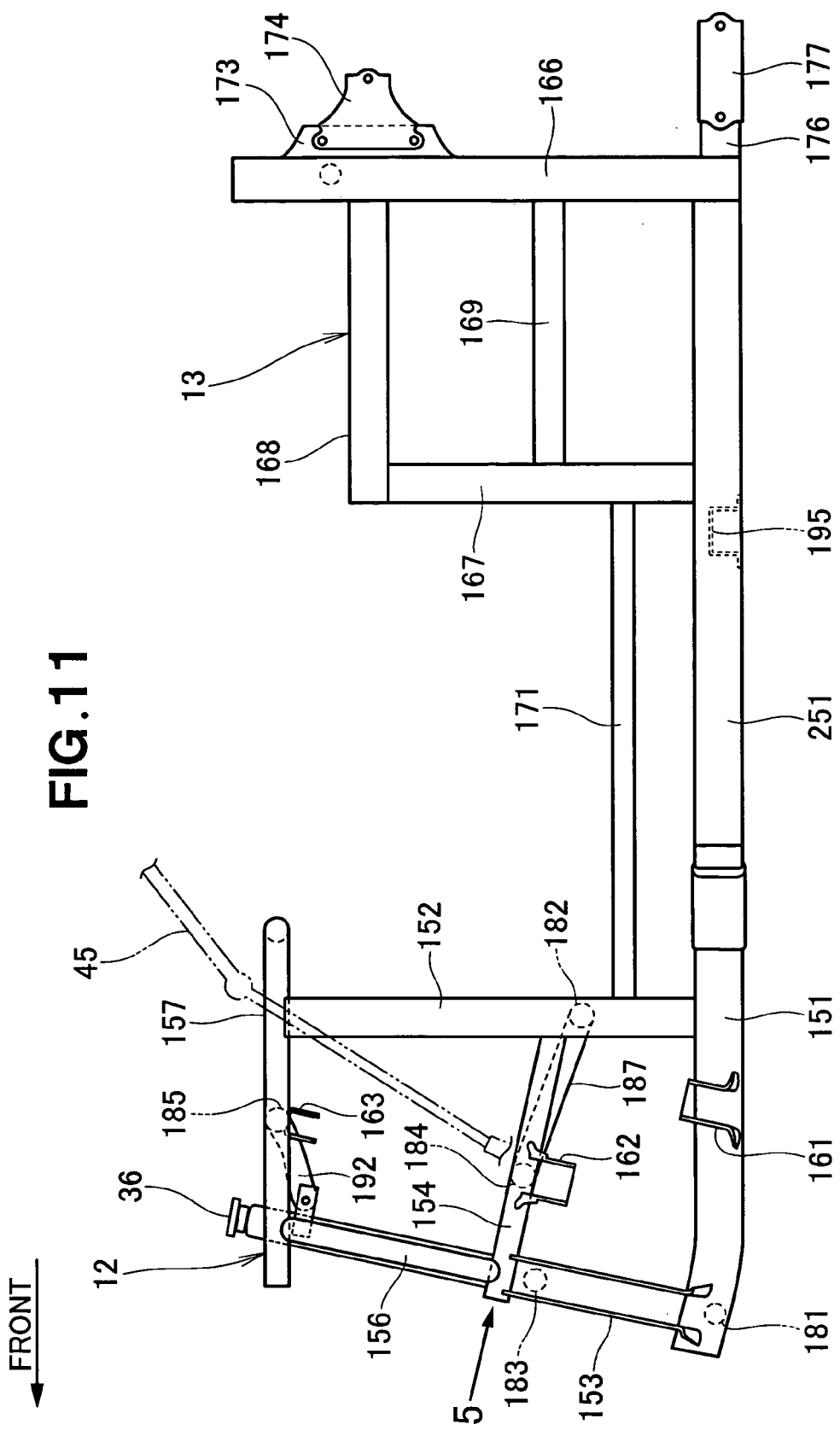

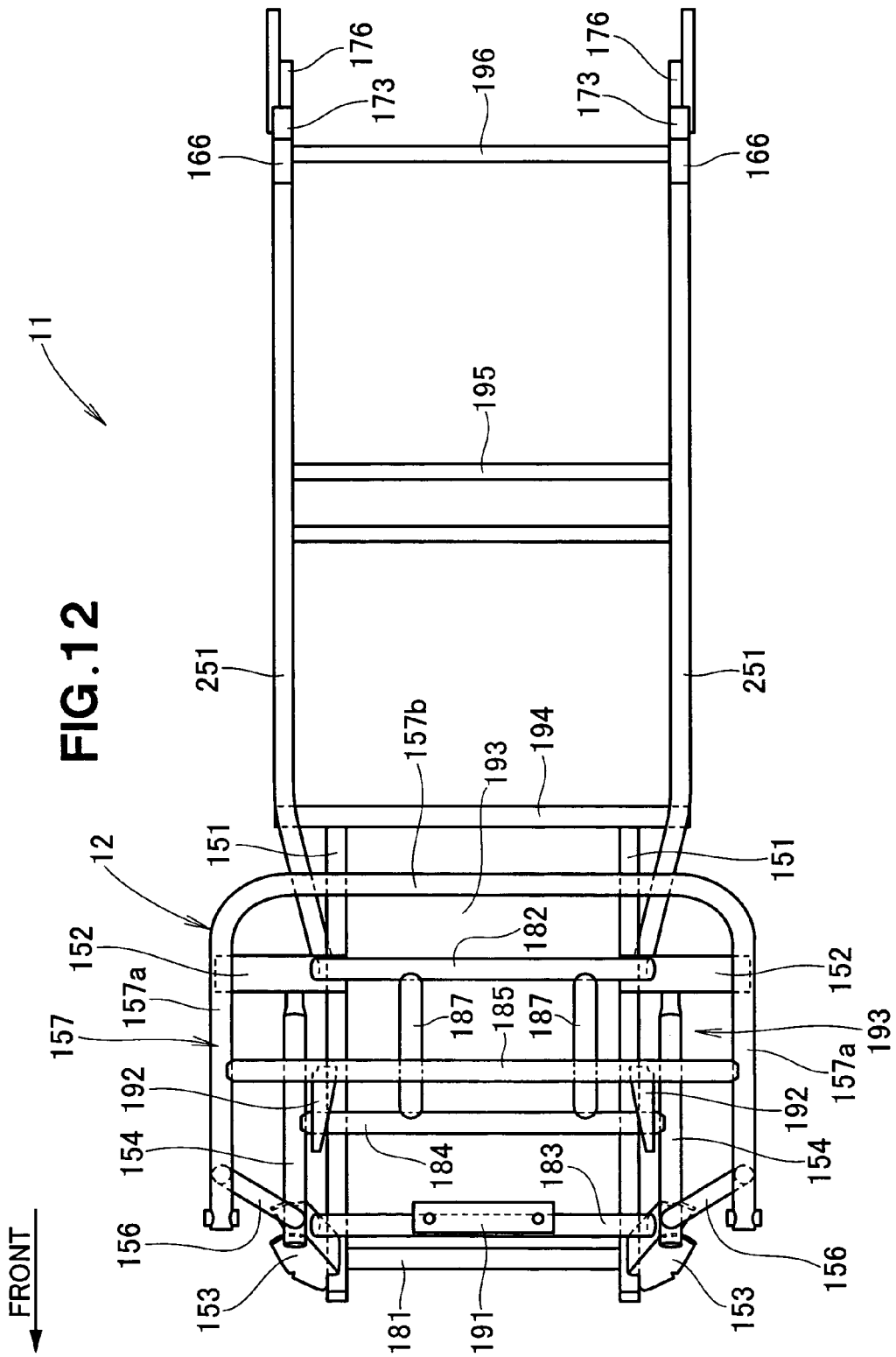

VEHICLE FLOOR STRUCTURE AND VEHICLE BODY FRAME STRUCTURE

FIELD OF THE INVENTION

The present invention relates to improvements in vehicle floor structures and vehicle body frame structures.

BACKGROUND OF THE INVENTION

Vehicle floor structures have been known, for example, from Japanese Patent Application Laid-open Publication No. SHO-63-20284, where a floor section on which a vehicle occupant rests his or her feet during driving or the like is located at substantially the same height or level as footboards or steps (hereinafter referred to as "boarding steps").

According to the disclosure in the No. SHO-63-20284 publication, a floor plate is provided between left and right side pipes constituting a main frame, and a step-mounting frame is secured to an outer side surface of each of the side pipes. Boarding step is secured to each of the step-mounting frames in such a manner that the floor plate and the boarding steps lie at substantially the same level. However, because the floor of the vehicle is formed by provision of the floor plate between the left and right side pipes, the disclosed floor structure can leave only a small space under the floor so that it is difficult to place component parts etc. of the vehicle in the under-floor space; generally, various harnesses, driving component parts, auxiliaries, etc. are placed in the under-floor space. If the under-floor space can be made greater, the above-mentioned component parts of the vehicle may be placed more easily in the under-floor space, and, besides, there may be secured an additional space for accommodating other small articles, which should achieve highly-enhanced convenience.

Further, vehicle body frame structures have been known, for example, from Japanese Patent Application Laid-open Publication No. HEI-1-164685, where suspension arms and suspension units are connected at their respective one ends to a frame member provided on a front portion of a vehicle body frame unit.

According to the disclosure in the No. HEI-1-164685 publication, a front body in the form of a thin press-formed plate, to which are secured upper and lower arms that support thereon a front wheel and suspension unit, is provided on a front frame constituting a front part of a front cage. Three brackets are provided on the front body, and one bracket is provided on a plate-shaped member constituting a lower tube that connects to a rear lower end portion of the front body. The upper arm is secured to one of the brackets on the front body, the lower arm is secured to another one of the brackets on the front body and to the bracket on the plate-shaped member, and the suspension unit is connected at its lower end to the upper arm. Respective assembly accuracy of the three brackets on the front body would considerably influence assembly accuracy of the upper and lower arms relative to a front axle and assembly accuracy of the suspension unit relative to the upper arm. Thus, if the assembly accuracy of the three brackets on the front body is lowered, then the assembly accuracy of the upper and lower arms and suspension unit would also be lowered. As a consequence, it tends to be difficult to manage the assembly accuracy of the brackets on the front body. Further, because the bracket on the plate-shaped member is separately provided from the front body, assembly accuracy between the font body and the plate-shaped member would also influence the assembly accuracy of the lower arm relative to the front axle, which tends to make the assembly accuracy management even more difficult. Further, from the viewpoint of the costs, it is desirable that the front body, to which the upper and lower arms and suspension unit are mounted, be simple in construction.

SUMMARY OF THE INVENTION

In view of the foregoing prior art problems, it is an object of the present invention to provide an improved vehicle floor structure which can secure a sufficient under-floor space by providing a subsidiary frame at a higher location than a lower frame and providing a floor on the subsidiary frame.

It is an object of the present invention to provide an improved vehicle body frame structure which can not only facilitate assembly accuracy management of respective mounting sections for a suspension arm and cushion unit but also simplify the construction of these mounting sections.

According to one aspect of the present invention, there is provided an improved vehicle floor structure, which comprises: a front frame for supporting thereon a front wheel suspension and a steering member; a lower frame connected to a rear end portion of the front frame; a seat frame provided above the lower frame for supporting thereon a seat; a foot-resting floor section provided above the lower frame; a subsidiary frame provided, between the front frame and the seat frame and at a position higher than the lower frame, for supporting thereon the floor section; and a step support frame, provided alongside the lower frame, for supporting thereon a boarding step adjacent to an outer side edge of the floor section, so that the floor section is located at a level higher than the boarding step.

With the floor section located higher than the boarding step, the seat has its upper surface located higher than the conventional counterpart, so that an improved range of vision can be afforded to a vehicle driver and a vehicle occupant can step onto and off the floor section with an enhanced ease and efficiency. Further, with the subsidiary frame located higher than the lower side frame, there can be formed a sufficient storage space, between the subsidiary frame and the lower side frame, for accommodating therein harnesses, driving components, auxiliaries, small articles, tools, etc.

In a preferred embodiment, the boarding step is disposed at substantially the same level as the lower frame. Thus, the boarding step can be readily provided by just projecting a step support member laterally from the lower frame. Preferably, in the present invention, the boarding step has a great area extending from near a side edge of the floor section rearwardly beyond the rear end of the seat, which thereby allows a vehicle occupant to get in and out of the vehicle with an increased ease and efficiency.

According to another feature of the invention, there is provided a vehicle body frame structure for supporting a suspension in each of left and right side sections of the vehicle, which comprises: a vehicle body frame unit; and a straight frame provided on the vehicle body frame unit in each of the left and right side sections of the vehicle, an upper arm, lower arm and rear cushion unit being mounted at the respective one ends to each of the straight frames to support the suspension.

Because the vehicle frame unit includes the straight frame to which are mounted the upper arm, lower arm and cushion unit, respective mounted sections can be provided in linear alignment with one another in the frame member along the length thereof. Such arrangements can facilitate respective assembly accuracy management of the upper arm, lower arm and rear cushion unit, thereby achieving an improved assembly accuracy of the suspensions. Further, because the straight frame has a linear shape, it can be simplified in construction and hence manufactured at low cost.

In the present invention, the straight frame is disposed substantially vertically, and thus, when the upper arm, lower arm and rear cushion unit are to be mounted to the straight frame, these arms and cushion unit can be readily assembled to the straight frame in a top-to-bottom or bottom-to-top direction, without a human operator or robot having to travel great distances in the horizontal direction, In a preferred embodiment, the straight frame has a channel-shaped cross section and is disposed with the opening portion of the channel-shaped cross section directed outwardly from the vehicle. In this way, the straight frame can have an enhanced rigidity so that the upper arm, lower arm and rear cushion unit can be assembled to the straight frame with an increased ease and enhanced accuracy.

In a preferred embodiment, the vehicle body frame unit includes a pair of the straight frames spaced apart from each other in a front-and-rear of the vehicle, and the cushion unit is mounted at its upper end portion to an upper portion of one of the straight frames, and the upper arm and the lower arm are mounted to both of the straight frames. Thus, the cushion unit can be mounted to a selected one of the straight frames, and the upper arm and the lower arm can be supported by the two straight frames with an increased strength.

In an embodiment, the upper arm includes an arm member and a link member connected to a distal end of the arm member, and the arm member is connected to the straight frame while and the link member is connected to a knuckle. The combination of the arm member and link member allows the construction of the upper arm to be selected with enhanced freedom, so that the design freedom of the suspension can be significantly increased.

BRIEF DESCRIPTION OF THE DRAWINGS

Certain preferred embodiments of the present invention will hereinafter be described in detail, by way of example only, with reference to the accompanying drawings, in which:

FIG. 8 is a perspective view showing a rear frame in the vehicle body frame structure of the present invention;

FIG. 9 is a side view of the rear frame in the vehicle body frame structure of the present invention;

FIG. 10 is a plan view of the rear frame in the vehicle body frame structure of the present invention;

FIG. 11 is a side view showing a front frame and center frame in the vehicle body frame structure of the present invention;

FIG. 12 is a plan view of a vehicle body frame unit in the vehicle body frame structure of the present invention;

DETAILED DESCRIPTION OF THE PREFERRED EMBODIMENTS

Figure 1:
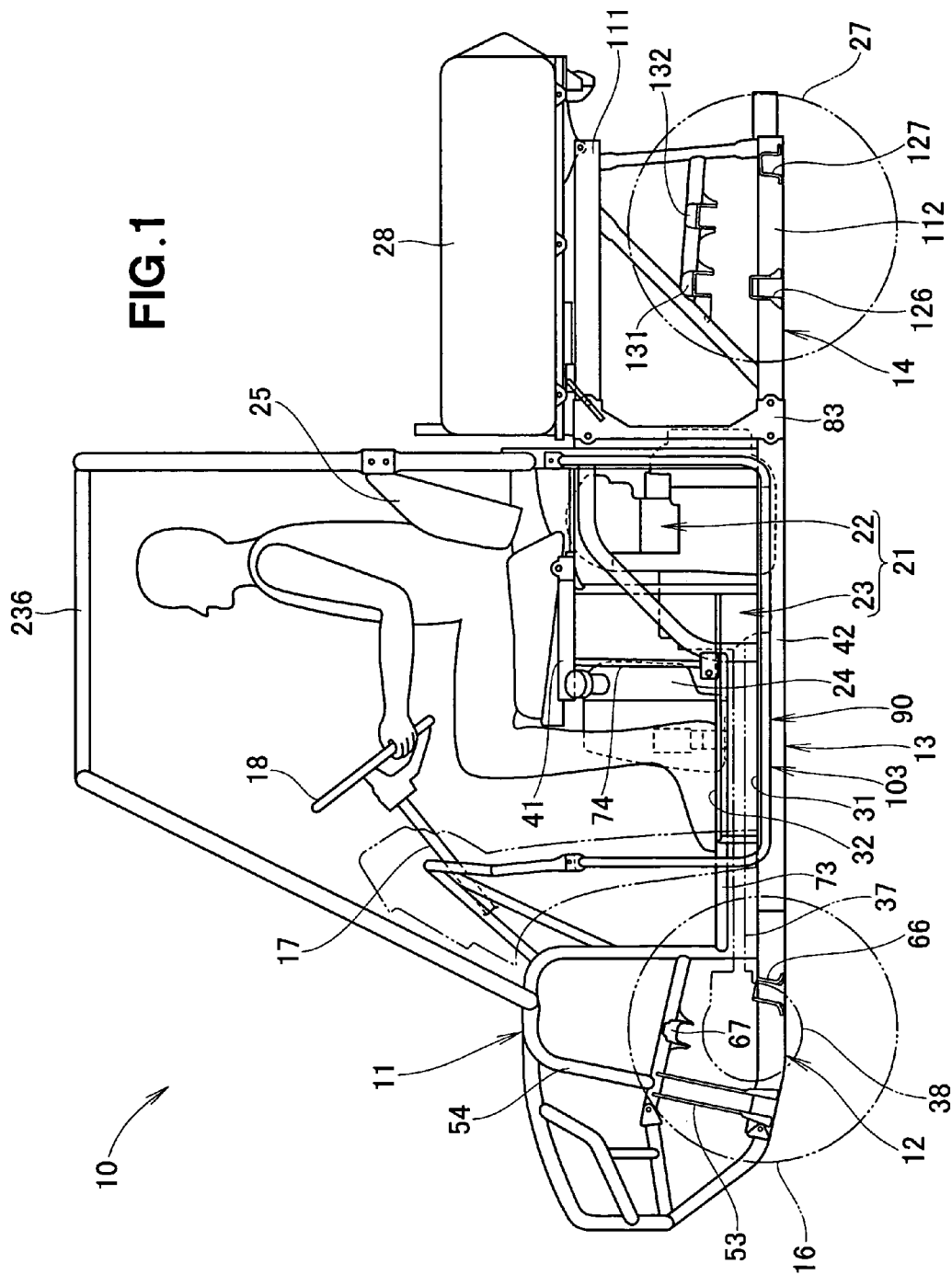
FIG. 1 is a side view of a vehicle in which are employed a vehicle floor structure and vehicle body frame structure of the present invention.

Reference is initially made to FIG. 1 showing in side elevation a vehicle employing a vehicle floor structure and vehicle body frame structure of the present invention. In the vehicle 10 designed for traveling on irregular or uneven surfaces, a vehicle body frame unit 11 comprises a front frame 12, center frame 13 and rear frame 14, and front wheel suspensions (not shown) for supporting left and right front wheels 16 are mounted on the front frame 12. On the front frame 12, there are also provided steering members for steering the front wheels 16, such as a steering shaft 17 and a steering wheel 18 mounted at the top of the steering shaft 17. On the center frame 13, there are provided a power unit 21 (including an engine 22 and a transmission or speed changer 23), fuel tank 24 and left and right seats 25 and 26 (only one of the seats, i.e. the left seat 25, is shown in the figure). Further, on the rear frame 14, there are provided rear wheel suspensions (not shown) supporting left and right rear wheels 27, and a tiltable luggage carrier 28.

The center frame 13 includes a pair of left and right boarding steps 31 (only one of them 31 is shown) on which a vehicle occupant puts his or her foot when getting in or out of the vehicle, and a floor section 32 located slightly higher than the boarding steps 31. Each vehicle occupant seated in one of the seats 25 or 26 rests the feet on the floor section 32. The vehicle also includes a roll bar unit 236 secured to the front frame 12 and center frame 13, a drive shaft 37 extending forward from the transmission 23, and a reduction case 38 connected to the distal end of the drive shaft 37.

Figure 2:
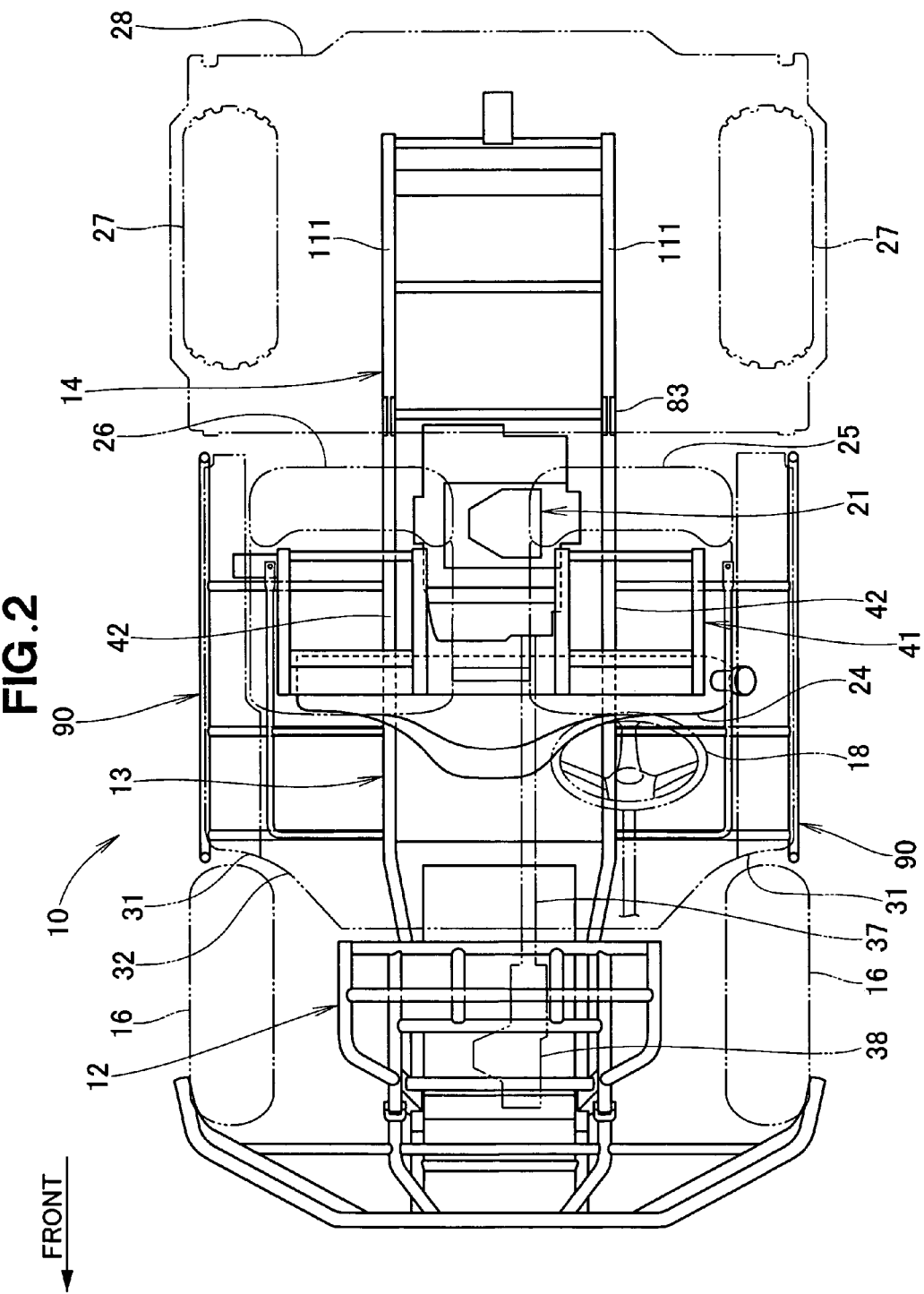
FIG. 2 is a plan view of the vehicle of FIG. 1.

FIG. 2 is a plan view of the vehicle of FIG. 1. In this and some of the subsequent figures, arrow "FRONT" indicates a forward direction of the vehicle. As shown, a seat frame 41 is mounted on the center frame 13 of the vehicle 10 and supports thereon the seats 25 and 26, and the power unit 21 is disposed beneath the seats 25 and 26 and between a pair of left and right lower side frame members 42 extending in a longitudinal or length direction (or front-and-rear direction) of the vehicle. Fuel tank 24 extends in a transverse or width direction (or left-and-right direction) of the vehicle beneath the seats 25 and 26.

Figure 3:
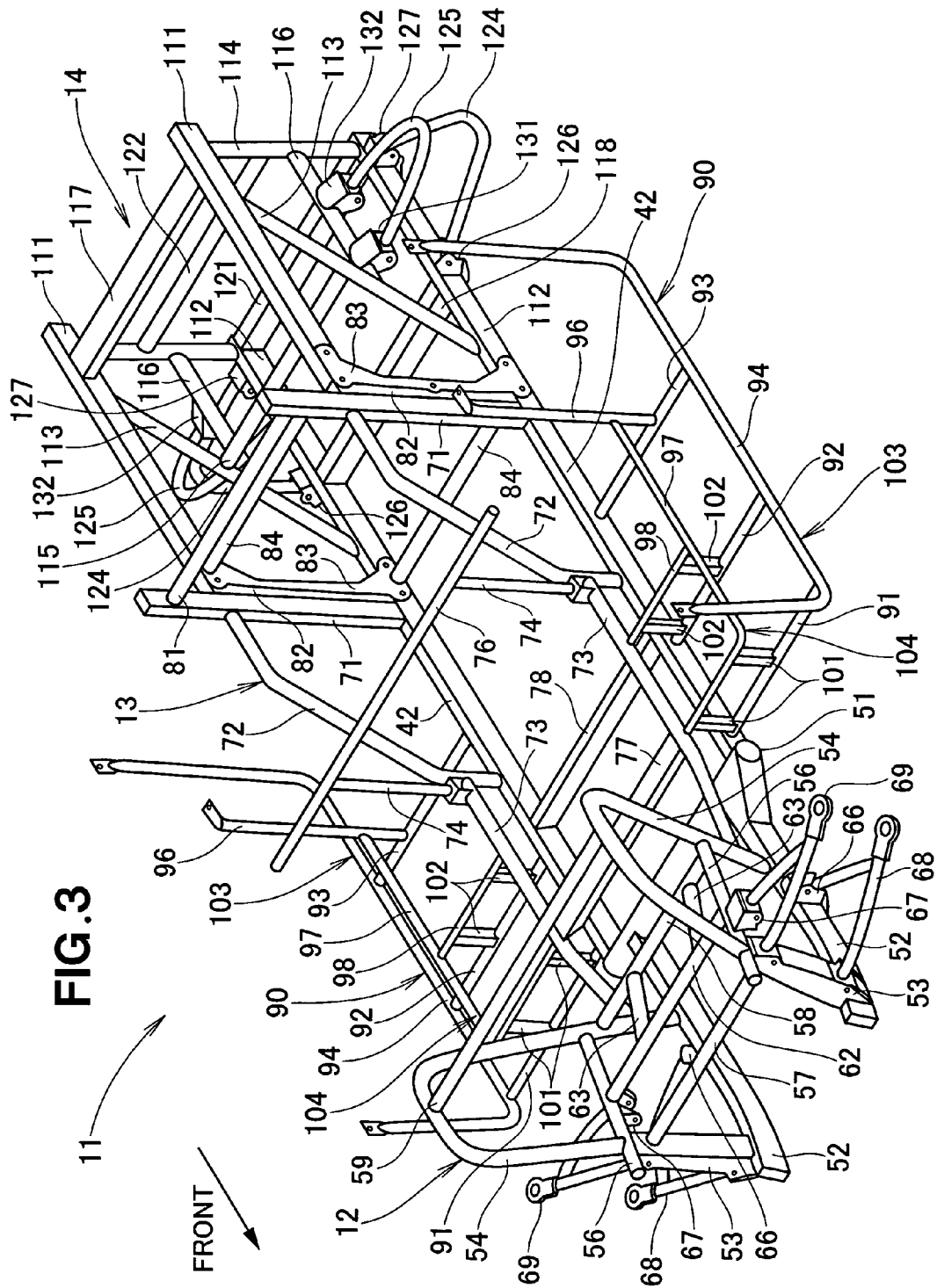
FIG. 3 is a perspective view of the vehicle body frame structure and step frame units in the vehicle of FIG. 1.

FIG. 3 is a perspective view of the vehicle body frame structure and step frame units in the vehicle of FIG. 1.

The front frame 12 of the vehicle body frame unit 11 includes a first front cross member 51 secured to the front ends of the lower side frame members 42, a pair of left and right front lower side frame members 52 extending forward from the opposite ends of the front cross member 51, a pair of left and right first front vertical frame members 53, each having a channel-shaped cross section, extending upward from the front lower side frame members 52, and a pair of left and right second front vertical frame members 54 each having a crochet needle shape. The front frame 12 also includes a pair of left and right front intermediate frame members 56 connected to the respective distal ends of the first and second front vertical frame members 53 and 54, a second front cross member 57 secured to and extending between the left and right first front vertical frame members 53, third and fourth cross member 58 and 59 secured to and extending between the left and right second front vertical frame members 54, a fifth front cross member 62 secured to and extending between the left and right front intermediate frame members 56, and connecting frame members 63 secured to and extending between the third and fifth cross members 58 and 62.

Each of the left and right front lower side frame members 52 has a front lower bracket 66 provided thereon, and this front lower bracket 66 and the left or right first front vertical frame member 53 together support at their lower end portions a lower arm 68 constituting ones of the front wheel suspensions.

Each of the left and right front intermediate frame members 56 has a front upper bracket 67 provided thereon, and this front upper bracket 67 and the left or right first front vertical frame member 53 together support at their upper end portions an upper arm 69 constituting one of the front wheel suspensions.

The center frame 13 includes a pair of left and right lower side frame members 42, a pair of left and right center vertical frame members 71 extending upward from respective rear portions of the lower side frame members 42, a pair of left and right bent frame members 72 each secured to and extending between the left or right lower side frame member 42 and the left or right center vertical frame member 71, and a pair of left and right subsidiary frame members 73 each secured to and extending between the left or right bent frame member 72 and the left or right second vertical frame member 54. The center frame 13 also includes seat support posts 74 extending upward from rear portions of the corresponding subsidiary frame members 73, a seat support member 76 secured to the upper ends of the respective seat support posts 74, a first center cross member 77 secured to and extending between the left and right subsidiary frames 73, a second center cross member 78 secured to and extending between the left and right lower side frame member 42, a third cross member 81 secured to and extending between the left and right center vertical frame members 71, and a pair of left and right connecting frame members 82 secured to respective rear portions of the left and right center vertical frame members 71. The center frame 13 also includes a pair of left and right connecting brackets 83 secured to the left and right connecting frame members 82 to detachably connect the center frame 13 to the rear frame 14 as will be later detailed, and fourth cross members 84 secured to and extending between the left and right connecting brackets 83.

The above-mentioned seat support bar 76 supports thereon the seats 25 and 26 via the seat frame 41 of FIG. 2 in conjunction with the left and right bent frame members 72.

To the lower side frame members 42 and subsidiary frame members 73 are secured to a pair of left and right step frame units 90 for supporting the boarding steps 31 (FIG. 1) and floor section 32 (FIG. 1).

Each of the left and right step frame units 90 includes first, second and third lower side frame members 91, 92 and 93 extending laterally outwardly from the corresponding lower side frame member 42, a channel-shaped side frame member 94 secured to respective one ends of the first, second and third lower side frame members 91, 92 and 93, a side vertical frame member 96 extending upward from a middle portion of the third lower side frame member 93, and an L-shaped upper side frame member 97 extending laterally outwardly from the subsidiary frame member 73 and then toward the rear of the vehicle and connected at its rear end to the side vertical frame member 96. Each of the left and right step frame units 90 also includes an upper side frame member 98 extending laterally outwardly from the subsidiary frame member 73 and connected at its distal end to the upper side frame member 97, first supporting posts 101 secured to and extending between the first lower side frame member 91 and the L-shaped upper side frame member 97, and second supporting posts 102 secured to and extending between the second lower side frame member 92 and the upper side frame member 98.

In each of the left and right sides of the vehicle, the first to third lower side frame members 91-93 and channel-shaped side frame member 94 together constitute a step support frame 103 for supporting thereon the above-mentioned left or right boarding step 31.

Further, the subsidiary frame members 73, L-shaped upper side frame members 97 and upper side frame members 98 together constitute a floor support frame 104 for supporting thereon the above-mentioned floor section 32.

Further, the rear frame 14 includes a pair of left and right rear upper frame members 111 and a pair of left and right rear lower frame members 112 secured via the connecting brackets 83 to the connecting frame members 82, a pair of left and right rear tilted frame members 113 secured to the rear upper frame members 111 and rear lower frame members 112, and a pair of rear vertical frame members 114 secured to and extending between respective rear end portions of the rear upper frame members 111 and rear lower frame members 112. The rear frame 14 also includes a first rear intermediate cross member 115 secured to and extending between the left and right rear tilted frame members 113, a pair of left and right rear intermediate frame members 116 secured to and extending between the rear tilted frame members 113 and the rear vertical frame members 114, a rear upper cross member 117 secured to and extending between the left and right rear upper frame members 111, first and second rear lower cross members 118 and 121 secured to and extending between the left and right rear lower frame members 112, and a second rear intermediate cross member 122 secured to and extending between the left and right rear vertical frame members 114.

The rear lower frame member 112 has left and right rear lower brackets 126 and 127 provided thereon, and these rear lower brackets 126 and 127 together support a lower arm 124 constituting one of the rear wheel suspensions.

Each of the rear intermediate frame member 116 has rear upper brackets 131 and 132 provided thereon, and these rear upper brackets 131 and 132 together support an upper arm 125 constituting one of the rear wheel suspensions.

Figure 4:
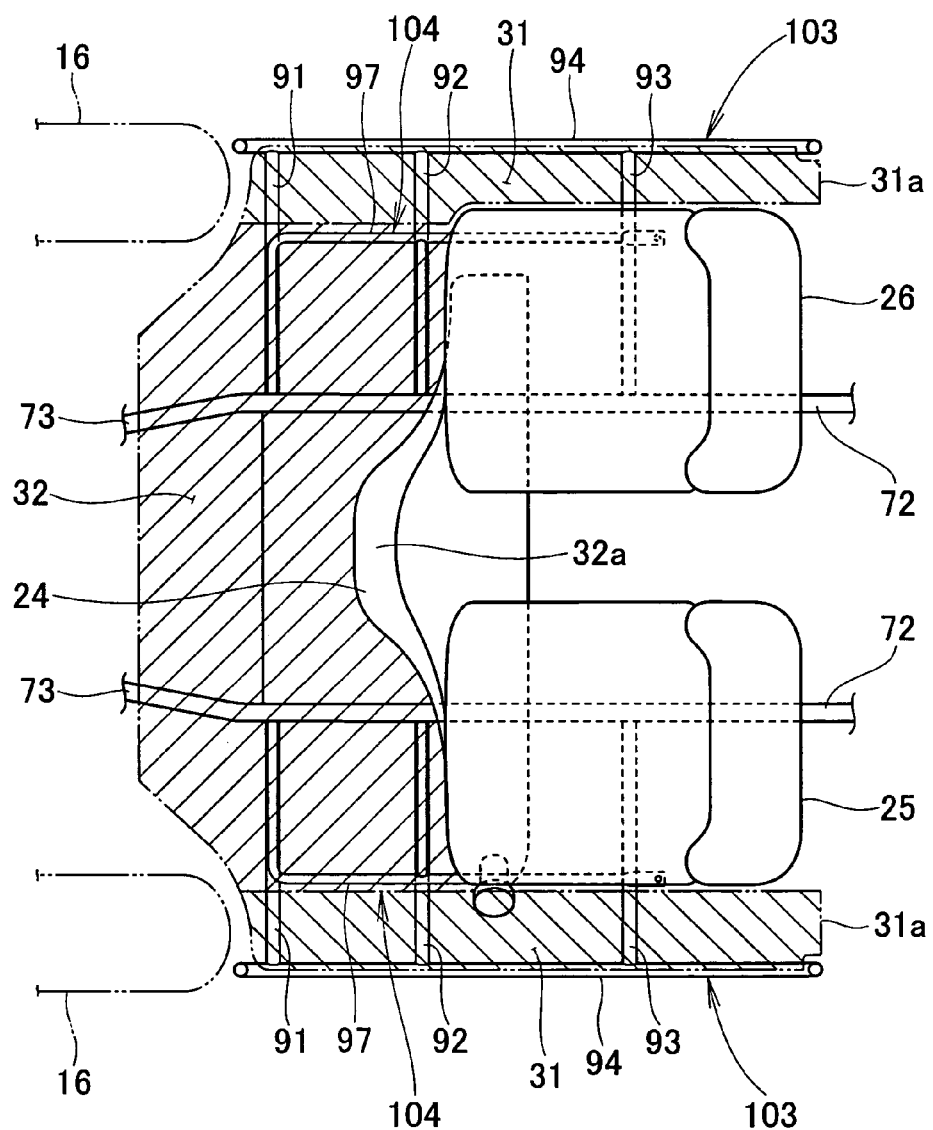
FIG. 4 is a plan view showing principal or relevant sections of the vehicle body frame structure.

FIG. 4 is a plan view showing principal or relevant sections of the vehicle body frame structure, in which the left and right boarding steps 31 and floor section 32 are indicated by hatching.

In the width or transverse direction (i.e., left-and-light direction) of the vehicle, each of the boarding steps 31 is located outwardly of the corresponding L-shaped upper side frame member 97 and extends up to an outer edge portion of the channel-shaped side frame member 94. In the length or longitudinal direction (i.e., front-and-rear direction) of the vehicle, each of the boarding steps 31 substantially coextends with the length of the channel-shaped side frame member 94, and the boarding step 31 has a rear end 31a located rearwardly of the seats 25 and 26.

Further, in the width direction of the vehicle, the floor section 32 is located generally inwardly of the outer side edges of the left and right L-shaped upper side frame members 97. In the length direction of the vehicle, the floor section 32 extends over a predetermined area with its front end edge adjoining a dashboard or instrument panel (not shown) that is located forwardly of the fuel tank 24 and rearwardly of the second upright frame member 54 of the front frame 12 (see FIG. 1). With the fuel tank 24 having a forwardly-bulging middle portion, the floor section 32 has its rear end edge portion 32a recessed forwardly; however, because the forwardly-recessed rear end edge portion 32a is located between the seats 25 and 25, the space around the feet of the vehicle occupant is not narrowed substantively.

Figure 5:
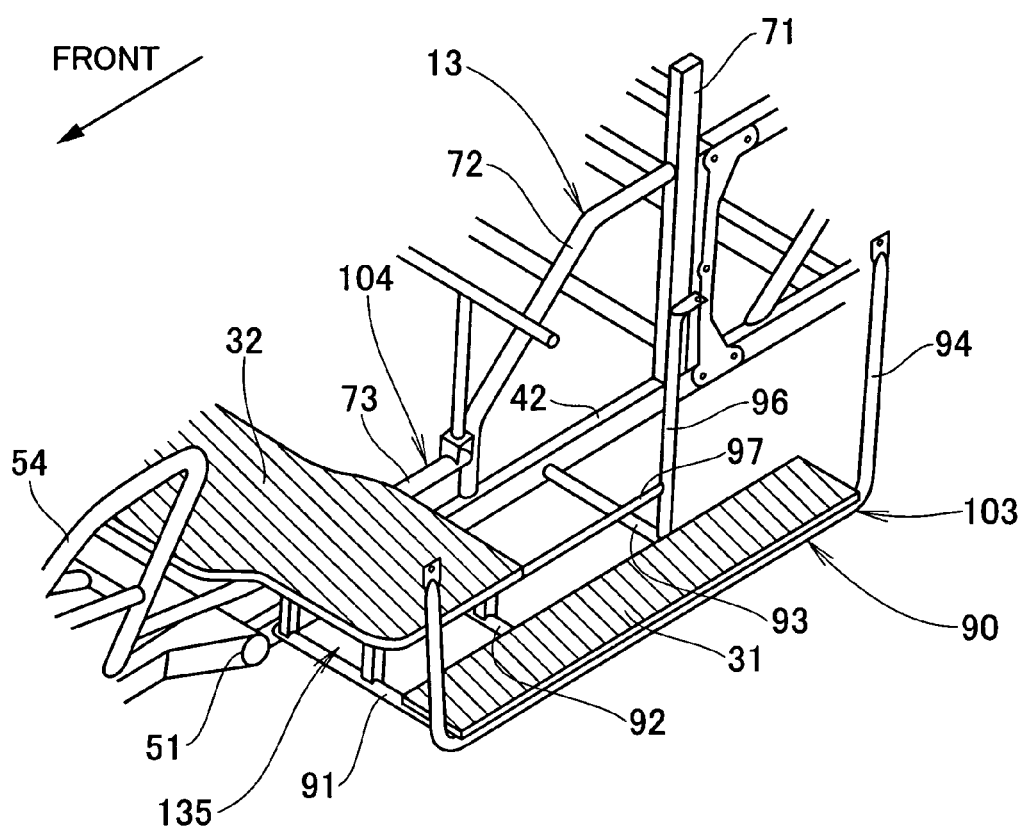
FIG. 5 is a perspective view showing a boarding step and floor section employed in the present invention.

FIG. 5 is a perspective view showing the boarding step 31 and floor section 32 employed in the present invention, which particularly shows that the boarding step 31 and floor section 32 are mounted on the step frame unit 90 and center frame 13. With the boarding step 31 located lower than the floor section 32, a person can easily step onto or off the floor section 32 by first putting his or her foot on the boarding step 31; thus, getting in and out of the vehicle can be made much easier than when stepping onto or off the floor 32 directly.

Further, with the floor section 32 located higher than the boarding step 31 in each of the left and right sides of the vehicle, a relatively great space 135, capable of accommodating therein harnesses, auxiliaries, tools, etc., can be formed under the floor section 32 and over the lower side frame members 42 (i.e., substantially in a position between the subsidiary frame members 73 and the lower side frame members 42).

As set forth above in relation to FIGS. 1, 4 and 5, the floor structure of the present invention comprises the front frame 12 having the steering shaft 17 and steering wheel 18 provided thereon, the lower side frame members 42 secured to the rear end portion of the front frame 12, and the seat frame 41 provided above the lower side frame members 42 for supporting thereon the seats 25 and 26 (see FIG. 2). The foot-resting floor section 32 is disposed above the lower side frame members 42, and the boarding steps 31 are disposed laterally outwardly of the floor section 32. The floor structure of the present invention is characterized primarily in that the subsidiary frame members 73 for supporting thereon the floor section 32 is provided between the front frame 12 and the seat frame 41 (more specifically, between the second upright frame members 54 of the front frame 12 and the bent frame members 72 of the center frame 13) and at a position higher than the lower side frame members 42, and in that the step support frames 103 for supporting thereon the boarding steps 31 are provided laterally outwardly of the lower side frame members 42; thus, the floor section 32 is located higher than the boarding steps 31.

With the floor section 32 located higher than the boarding steps 31, the seats 25 and 26 have their upper surfaces located higher than the conventional counterparts, so that an improved range of vision can be afforded to the vehicle driver and each vehicle occupant can step onto and off the floor section 32 with an enhanced ease and efficiency. Further, with the subsidiary frame members 73 located higher than the lower side frame members 42, there can be formed the sufficient space 135, between the subsidiary frame members 73 and the lower side frame members 42, for accommodating therein harnesses, driving components, auxiliaries, small articles, tools, etc.

Figure 6:
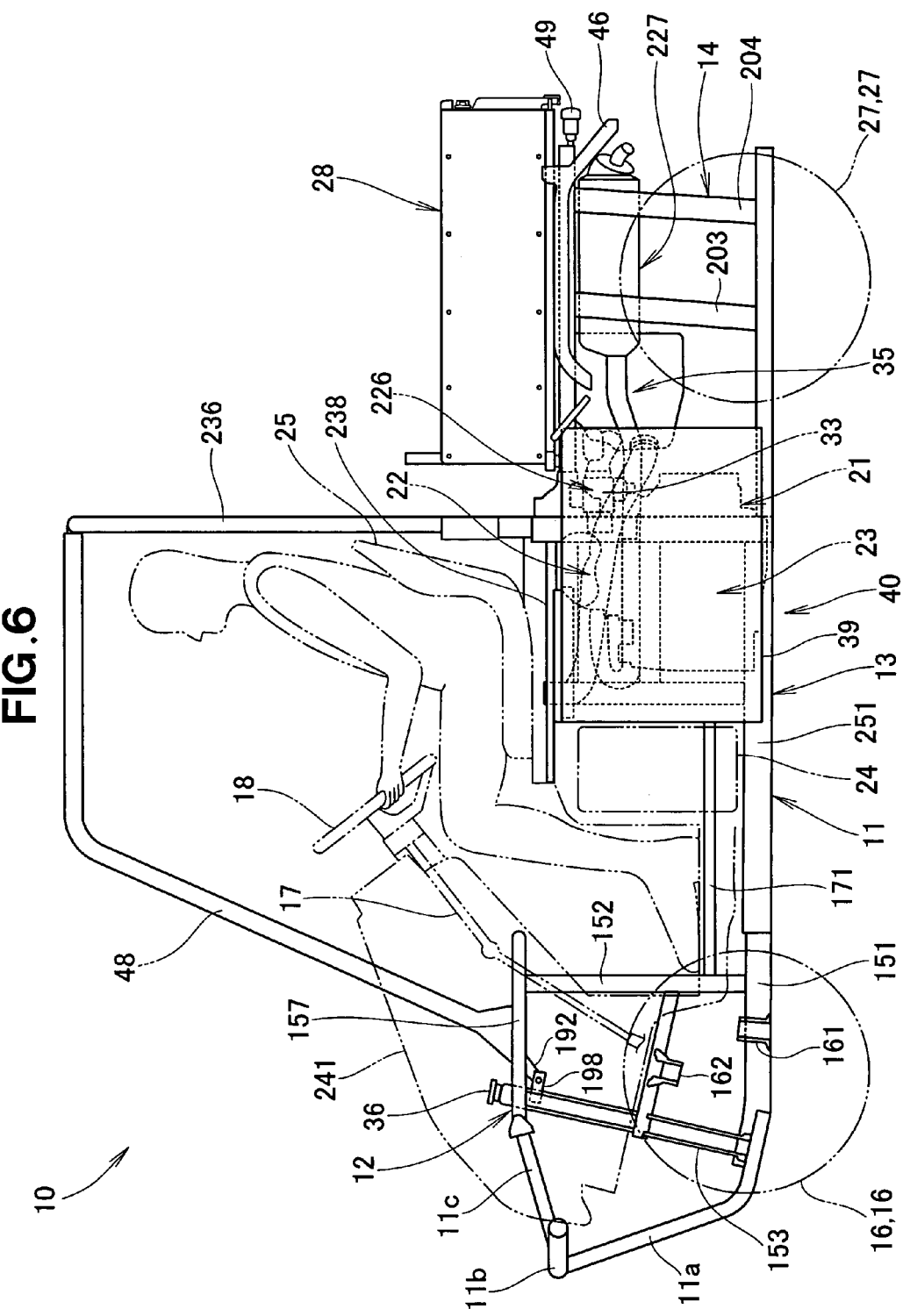
FIG. 6 is a side view of a vehicle in which is employed a preferred embodiment of the vehicle body frame structure of the present invention.

FIG. 6 a side view of a vehicle in which is employed a preferred embodiment of the vehicle body frame structure of the present invention. As shown, the vehicle 10 is designed for traveling on irregular or uneven surfaces, which generally comprises: a vehicle body frame unit 11 including a front frame 12, center frame 13 and rear frame 14; left and right front wheels 16; a power unit 21 (including an engine 22 and transmission or speed changer 23); an air intake system 226 disposed behind the engine 22 for supplying air and fuel to the engine 22; an air exhaust system 227 extending rearwardly from a front portion of the engine 22; a luggage carrier 28 tiltably mounted on the rear frame 14; and left and right rear wheels 27.

The front wheels 16 are supported on the front frame 12, the engine 22 and floor section 32 are supported on the center frame 13, and the rear wheels 27 are supported on the rear frame 14. Because the floor section 32 is supported on the center frame 13 that inherently has great rigidity for supporting the heavy engine 22, no particular reinforcing member is necessary for supporting the floor section 32 on the center frame 13, so that it is possible to reduce the overall weight and costs of the vehicle 10. Further, because the floor section 32 is positioned in front of the seat frame 41 provided on the center frame 13, vehicle occupants seated in the seats 25 and 25 can be reliably supported by the highly rigid center frame 13.

The air intake system 226 includes a carburetor 33 operatively connected to the engine 22, and an air cleaner 35 connected to the carburetor 33.

In the figure, reference numeral 11a represents a bumper support pipe, 11b a bumper, 11c a pipe connecting the bumper 11b and an upper end portion of the front frame 12. 36 represents a radiator supported by the front frame 12, 24 a fuel tank, 238 an upper partition wall separating a vehicle compartment from the power unit 21, 39 a pair of left and right side partition walls (only one of which is shown in the figure) separating left and right side edge portions of the vehicle body from the power unit 21, and 40 an engine room enclosed by the above-mentioned fuel tank 24, upper partition wall 238 and left and right side partition walls 39. Further, 241 represents a front cover, 17 a dividable steering shaft coupled to the steering wheel 18 operable by the vehicle driver to steer the front wheels 16 and supported by the front frame 12. Furthermore, 46 represents rear fenders (only one of which is shown), 236 a roll bar unit extending vertically from the center frame 13, 48 upper frame members (only one of which is shown) secured to and extending between the center frame 13 and the roll bar unit 236, and 49 tail lamps (only one of which is shown).

Figure 7:
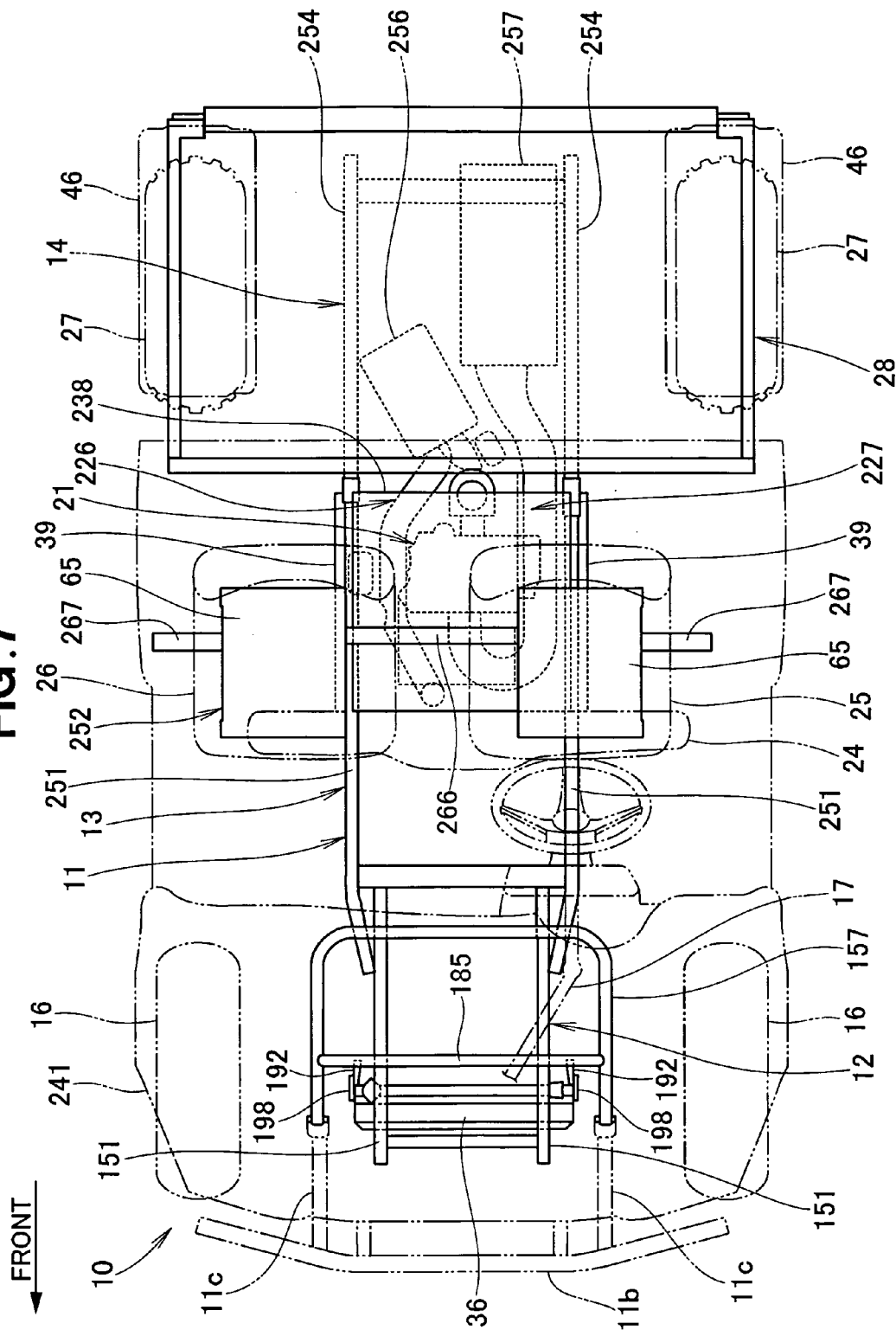
FIG. 7 is a plan view of the vehicle of FIG. 6.

FIG. 7 is a plan view of the vehicle of FIG. 6. The center frame 13 of the vehicle body frame unit 11 includes a pair of left and right center side frame members 251, a seat frame 252 is secured to the center side frame members 251, and left and right seats 25 and 26 are fixed on the seat frame 252. The rear frame 14 of the vehicle body frame unit 11 includes a pair of left and right rear side frame members 254, and an air cleaner body 256 of the air intake system 226 and a muffler 257 of the air exhaust system 227 are disposed between the left and right rear side frame members 254.

The seat frame 252 includes seat support plates 65 for supporting thereon the seats 25 and 26, a connecting frame member 266 interconnecting the seat support plates 65, and lateral frame members 267 projecting laterally outwardly from the seat support plates 65. The lateral frame members 267 support thereon armrests (not shown).

The luggage carrier 28 is mounted on the pair of left and right rear side frame members 254 of the rear frame 14. The fuel tank 24 is disposed beneath the seats 25 and 26 to extend in the transverse direction of the vehicle.

The upper partition wall 238 has a width (i.e., dimension in the transverse direction of the vehicle) substantially equal to a distance between the left and right center side frame members 251, and it has a length (i.e., dimension in the longitudinal direction of the vehicle) covering almost the entire power unit 21 as viewed in plan. The left and right side partition walls 39 are each disposed practically along a side surface of the corresponding left or right side frame member 251.

FIG. 8 is a perspective view showing the rear frame 14 in the vehicle body frame structure of the present invention. The rear frame 14 includes the left and right rear side frame members 254 and left and right rear lower frame members 202 connected to left and right main center vertical frame members 166 (only one of which is shown in the figure) extending upward from the left and right center side frame members 251 (only one of which is shown in the figure) of the center frame 13, and two pairs of left and right straight vertical frame members 203 and 204.

Reference numerals 173 and 176 represent upper and lower protruding portions, 174 an upper connection member that connects the rear side frame member 254 to the upper protruding portion 173, and 177 a lower connection member that connects the rear lower frame member 202 to the lower protruding portion 176.

In each of the left and right rear side sections of the vehicle, the straight vertical frame members 203 and 204 support the rear wheel suspension 207. The rear wheel suspension 207 includes lower arms 208 each secured to a lower end portion of one of the vertical frame members 203 and 204 for vertical pivotal movement, an arm member 211 disposed above the lower arms 208 and vertically pivotably secured to the vertical frame members 203 and 204, and an upper subsidiary arm member 212 secured to the distal end of the arm member 211. The rear wheel suspension 207 also includes a knuckle (not shown) connected to the respective distal ends of the lower arms 208 and upper subsidiary arm member 212, a hub 215 provided with a plurality of bolts 214 rotatably fastening the hub 215 to the knuckle and mounting thereto the corresponding rear wheel 27 (see FIG. 6), a rear cushion unit 217 secured to and extending between an upper end portion of the vertical frame member 203 and the lower arm 208, and an anti-roll bar 258 interconnecting the left and right arm members 211. Reference numeral 221 represents a brake disk secured to the hub 215, and 222 brake calipers secured to the knuckle for sandwiching therebetween the brake disk 221 to effect braking. In each of the left and right rear side sections of the vehicle, the above-mentioned arm member 211 and upper subsidiary arm member 212 together constitute an upper arm 224.

FIG. 9 is a side view of the rear frame 14 in the vehicle body frame structure of the present invention, which particularly indicates that the vertical frame member 203 provided in each of the left and right side sections of the vehicle is inclined at a relatively small angle θ to a vertical line 223. As shown, the rear lower frame member 202 and rear side frame member 254 extend substantially horizontally in parallel to each other, and the vertical frame members 203 and 204 also extend in parallel to each other. The angle θ is in the range of 0° to 20°, and thus, the vertical frame members 203 and 204 may be said as extending almost in the vertical direction.

Each of the vertical frame members 203 and 204 has a channel-shaped cross section defined by a pair of opposed side walls 203a, 204a; the opening portion of the channel-shaped cross section is directed (i.e., opens) outwardly from the vehicle body. A pair of opposed holes, through which opposite end portions of a pivot shaft of the corresponding lower arm 208 are passed, are formed in lower end portions of the opposed side walls 203a, 204a of each of the vertical frame members 203 and 204; these opposed holes function in each of the vertical frame members 203 and 204 function as a lower arm mounting section 203B or 204B. Also, in each of the vertical frame members 203 and 204, a hole is formed in a middle portion of one of the opposed side walls 203a, 204a, so that a pivot shaft of the arm member 211 is supported at its opposite ends by the holes formed in the opposed side walls 203a and 204a of the frame members 203 and 204; thus, these holes formed in the frame members 203 and 204 function as an upper arm mounting section 203C or 204C.

Further, in the vertical frame member 203, a pair of opposed holes, through which opposite end portions of a pivot shaft of the corresponding rear cushion unit 217 (see FIG. 8) are passed, are formed in upper end portions of the opposed side walls 203a; these opposed holes function as a rear cushion mounting section 203D.

The lower arm mounting section 203B, upper arm mounting section 203C and rear cushion mounting section 203D, provided in the front straight vertical frame member 203, are linearly arranged or aligned with one another along the length of the frame member 203. Thus, the instant embodiment permits facilitated assembly accuracy management of the lower arm 208, upper arm 224 and rear cushion unit 217 assembled to the respective mounting sections 203B, 203C and 203D, thereby enhancing assembly accuracy of the components 208, 224 and 217. The other or rear straight vertical frame member 204 in the instant embodiment can achieve substantially similar benefits to those as achieved by the front straight vertical frame member 203, although it has no rear cushion mounting section.

Here, the "facilitated assembly accuracy management" means that, a connecting position where the lower arm 208 and rear cushion unit 217 are to be interconnected can be determined easily if the lower arm 208 and rear cushion unit 217 are in linear alignment with each other along the length of the vertical frame member 203 line when the components 208, 224 and 217 have been mounted to the respective mounting sections 203B, 203C and 203D. Namely, in case the mounting sections for the lower arm 208 and rear cushion unit 217 are not aligned linearly, an error in distance between the position where the lower arm 208 is to be mounted and the position where the rear cushion unit 217 is to be mounted would adversely influence the mounting or assembly of the lower arm 208 and rear cushion unit 217; thus, the assembly accuracy management of these components tends to be difficult to perform, which can lead to a great mounting or assembly error.

FIG. 10 is a plan view of the rear frame 14 in the vehicle body frame structure of the present invention. As shown, upper cross members 245 and 246 extend between and are secured to the left and right rear side frame members 254, an intermediate cross member 247 extends between and is secured to the left and right vertical frame members 203, an intermediate cross member 248 extends between and is secured to the left and right vertical frame members 204, and lower cross members 261 and 262 extend between and are secured to the left and right rear lower frame members 202 (see also FIG. 8).

Referring back to FIG. 8, the rear frame 14 is an assembly constructed by connecting together the rear side frame members 254 and rear lower frame members 202, extending in the longitudinal direction of the vehicle, by means of the vertical frame members 203 and 204, upper cross members 245 and 246, intermediate cross members 247 and 248 and lower cross members 261 and 262. The thus-constructed assembly can enhance the rigidity of the rear frame 14 and thus effectively prevent the rear frame 14 from being deformed by external force transmitted from each of the rear wheel suspensions 207 to the rear frame 14.

As described above in relation to FIGS. 8 and 9, the embodiment of the vehicle body frame structure is intended to support each of the left and right rear wheel suspensions 207 via the upper arm 224, lower arm 208 and rear cushion unit 217 mounted at their respective one ends to the vehicle body frame unit 11, and it is characterized by inclusion of the straight vertical frame members 203 and 204 mounting the upper arm 224, lower arm 208 and rear cushion unit 217 to the frame unit 11.

Further, in the embodiment of FIGS. 8 and 9, the lower arm mounting section 203B, upper arm mounting section 203C and rear cushion mounting section 203D in each of the left and right side sections of the vehicle are provided in linear alignment with one another in the vertical frame member 203 along the length thereof, and the upper arm mounting section 204C and lower arm mounting section 204B are provided in linear alignment with each other in each of the vertical frame 204. Such arrangements can facilitate assembly accuracy management of each of the upper arm 224, lower arm 208 and rear cushion unit 217, thereby achieving an improved assembly accuracy of the rear wheel suspension 207. Further, the vertical frame members 203 and 204, each having a linear shape, can be simplified in construction and hence manufactured at low cost.

FIG. 11 is a side view showing the front frame 12 and center frame 13 in the vehicle body frame structure of the present invention. The front frame 12 includes, in each of the left and right side sections of the vehicle, a front lower frame member 151 connected to the center side frame member 251, a main front vertical frame member 152 and subsidiary front vertical frame member 153 extending upwardly from the front lower frame member 151, and an intermediate side frame member 154 extending forwardly and upwardly from an intermediate portion of the main front vertical frame member 152. The front frame 12 also includes an upper vertical frame member 156 extending upward from the intermediate side frame member 154, and a U-shaped frame member 157 supported on the respective upper ends of the upper vertical frame member 156 and main front vertical frame member 152. The above-mentioned main front vertical frame member 152, subsidiary front vertical frame member 153, intermediate side frame member 154 and upper vertical frame member 156 are provided in each of the left and right side sections of the vehicle.

The main front lower vertical frame member 151 has a lower bracket 161 provided thereon for supporting a suspension arm (lower arm), and the intermediate side frame member 154 has an upper bracket 162 provided thereon for supporting another suspension arm (upper arm).

The subsidiary front vertical frame member 153 is channel-shaped in cross section and supports the upper and lower suspension arms. The U-shaped frame member 157 has a cushion support bracket 163 for supporting one end of a front cushion unit for the front suspension.

The center frame 13 includes the main center vertical frame member 166 and subsidiary center vertical frame member 167 extending upwardly from the center side frame member 251, an upper center frame member 168 extending forward from an intermediate portion of the main center vertical frame member 166 and connected to the top of the subsidiary center vertical frame member 167, and an intermediate center frame 169 secured to and extending between the main center vertical frame member 166 and the subsidiary center vertical frame member 167.

Reference numeral 171 represents a subsidiary frame that is secured to and extends between the main front vertical frame member 152 of the front frame 12 and the subsidiary center vertical frame member 167 of the center frame 13 in parallel to the center side frame member 251. The subsidiary frame 171 is provided for mounting thereon a floor plate on which each vehicle occupant rests the feet.

The main center vertical frame member 166 has the upper protruding portion 173 for connecting the front frame 13 and rear frame 14 (see FIG. 6), upper connection member 174 provided on the upper protruding portion 173, lower protruding portion 176, and lower connection member 177 provided on the lower protruding portion 176.

FIG. 12 is a plan view of the vehicle body frame unit in the vehicle body frame structure of the present invention. The front frame 12 includes a first cross pipe 181 secured to and extending between the left and right front lower frame members 151, a second cross pipe 182 secured to and extending between the left and right main front vertical frame members 152, a third cross pipe 183 secured to and extending between the left and right subsidiary front vertical frame members 153, and a fourth cross pipe 184 secured to and extending between the left and right intermediate side frame members 154. The front frame 12 also includes a fifth cross pipe 185 extending in the transverse direction of the vehicle to connect between opposed longitudinally-projecting portions 157a of the U-shaped frame member 157, and two pipes 187 extending in the longitudinal direction of the vehicle to connect between the second cross pipe 182 and the fourth cross pipe 184.

The above-mentioned third cross pipe 183 has a lower bracket 191 provided thereon for supporting the lower end of the radiator 36 (see FIG. 6), and the fifth cross pipe 185 has two forwardly-projecting upper brackets 192 provided thereon for supporting an upper portion of the radiator 36.

The U-shaped frame member 157 is an integrally-formed member having a transverse portion 157b extending in the width direction of the vehicle and the opposed longitudinally-projecting portions 157a extending forwardly from opposite ends of the transverse portion 157b. Inner space 193 is defined by the transverse portion 157b and opposed longitudinally-projecting portions 157a, and the radiator 36, auxiliaries (e.g., electrical equipment), etc. can be placed in this space 193 so that these radiator 36, auxiliaries, etc. can be protected particularly from external force applied from the sides of the vehicle. The U-shaped frame member 157 also supports the left and right upper frame members 48 (FIG. 6) by means of the longitudinally-projecting portions 157a.

In FIG. 12, reference numeral 194 represents a lower cross member secured to and extending between the left and right center side frame members 251 and interconnecting the respective rear ends of the left and right front lower frame members 151, 195 a first center cross member secured to and extending between the left and right center side frame members 251, and 196 a second center cross member secured to and extending between the main center vertical frame members 166.

Figure 13:
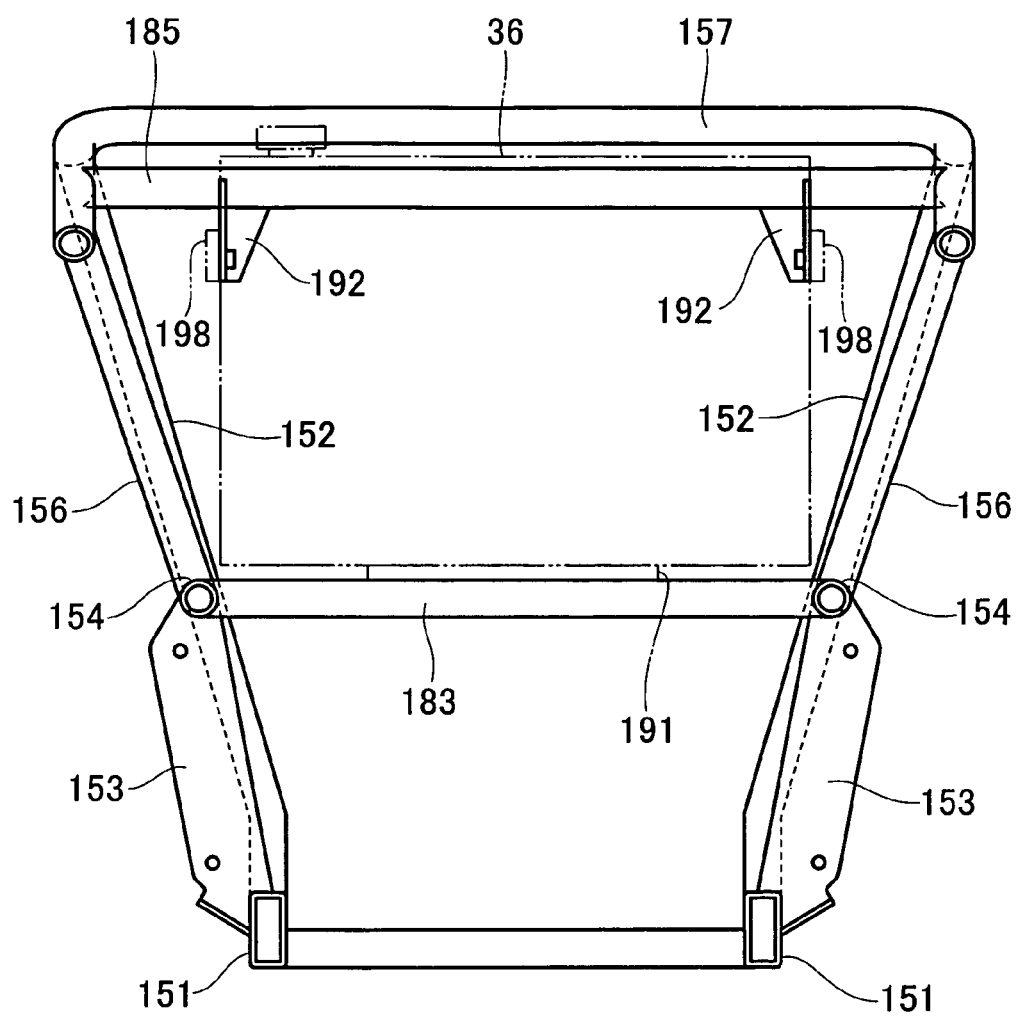
FIG. 13 is a view taken in a direction of arrow "5" of FIG. 11.

FIG. 13 is a view taken in a direction of arrow "5" of FIG. 11, which particularly indicates that the radiator 36 is supported by the front frame 12. More specifically, the lower end of the radiator 36 is secured to the lower bracket 191 on the third cross pipe 183, and the radiator 36 is secured at its upper side surface to the upper brackets 192 on the fifth cross pipe 185 via stays 198. The U-shaped frame member 157 covers an upper portion of the radiator 36 and particularly protects opposite side surfaces of the radiator 36 by means of the longitudinally-projecting portions 157*a*. If the radiator 36 is mounted to the U-shaped frame member 157, it can be placed at a relatively high position of the vehicle 10 and, thus, can be prevented from being undesirably immersed in water when the vehicle is traveling, for example, on a river area or swampy place. Further, the steering shaft 17 can be protected by a rear portion of the U-shaped frame member 157. Furthermore, the bumper 11*b* can increase the rigidity of the U-shaped frame member 157 and can protect the radiator 36, auxiliaries, etc., surrounded by the frame 157, with an increased reliability. In an alternative, the radiator 36 may be protected by a rectangular frame member rather than the U-shaped frame member 157. The vehicle body frame structure according to with the preferred embodiment are particularly suited for traveling on uneven or irregular surfaces.

Figure 14:
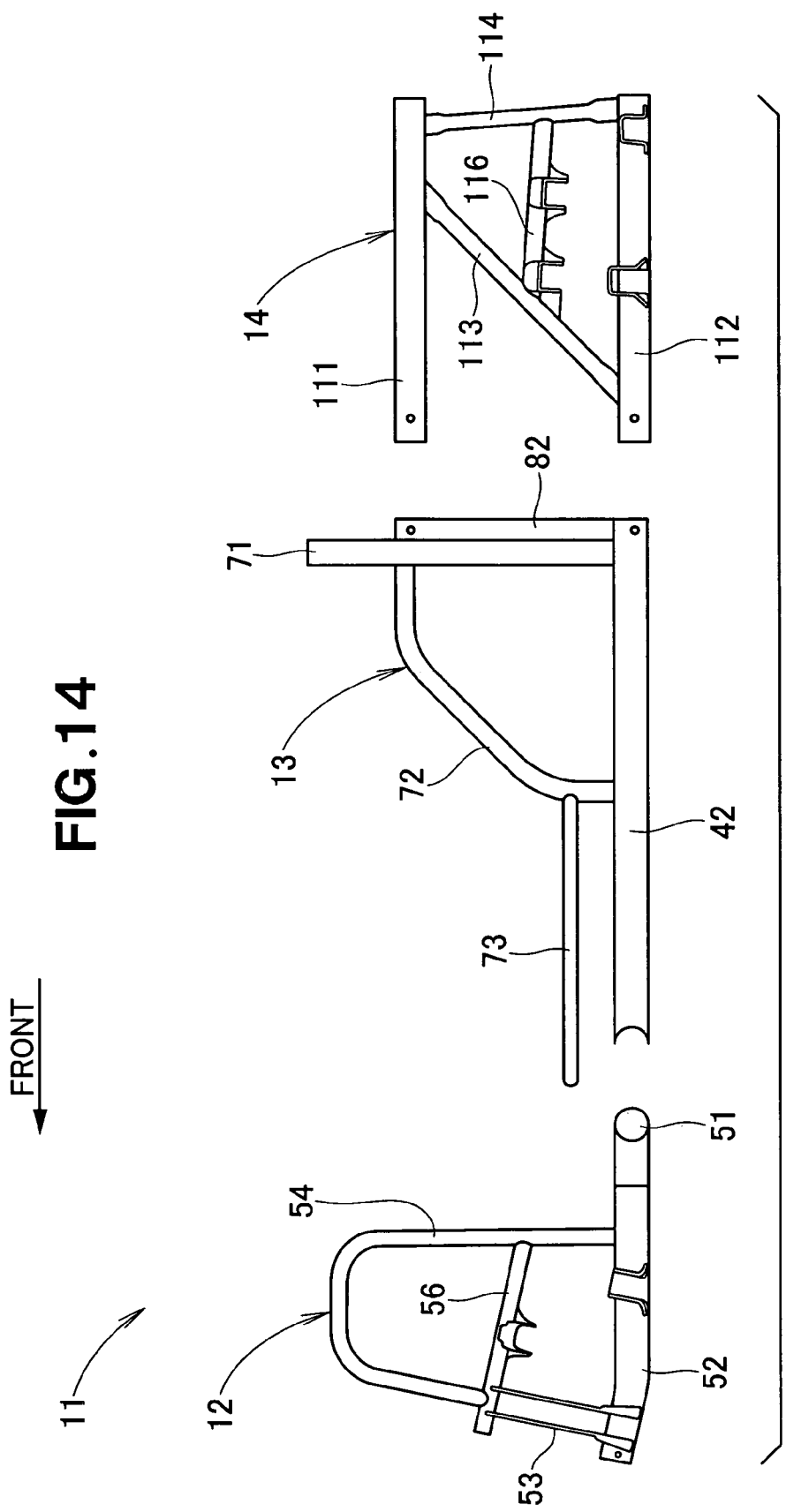
FIG. 14 is a side view showing the vehicle body frame unit in a predetermined divided state.

FIG. 14 is a side view showing the vehicle body frame unit 11 of the present invention in a predetermined divided state. Namely, in each of the left and right side sections of the vehicle, the front frame 12 and center frame 13 can be separated from each other at a joint between the respective distal ends of the first front cross member 51 and the lower side frame member 42 and at a joint between the second front vertical frame member 54 and the distal end of the subsidiary frame member 73. Further, the center frame 13 and rear frame 14 can be separated from each other at joints between the connecting frame member 82, rear upper frame member 111 and rear lower frame member 112.

Because the vehicle body frame unit 11 is dividable into the front frame 12, center frame 13 and rear frame 14 in the above-explained manner, each of the frames 12, 13 and 14 can be carried and stored with an increased ease by virtue of its small size and weight. Further, if the frames 12, 13 and 14 are each fabricated in advance, the entire vehicle body frame 11 can be assembled with ease by just joining together the front frame 12 and center frame 13 via bolts and nuts, which can achieve enhanced assemblying efficiency and productivity.

Figure 15:
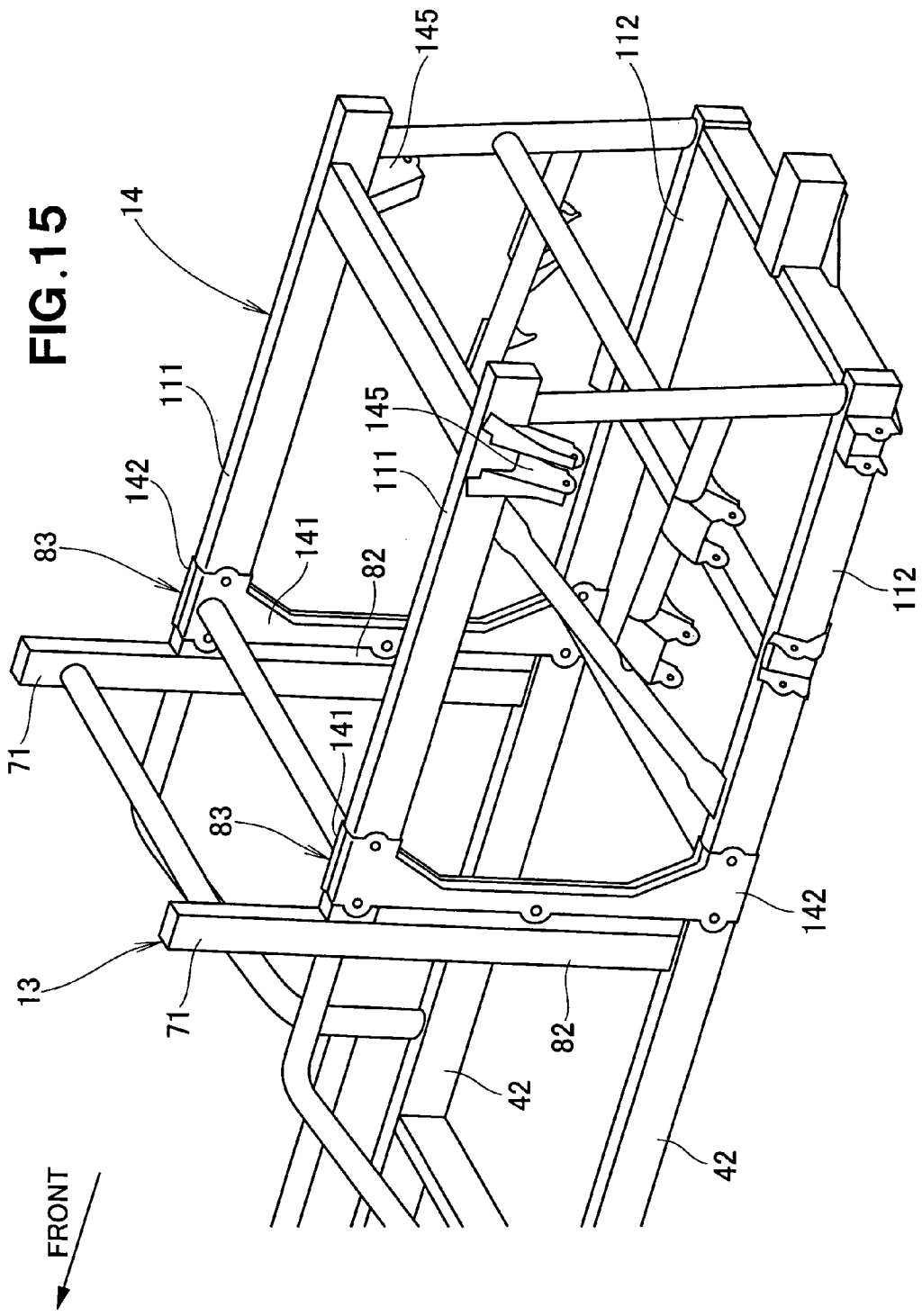
FIG. 15 is a first perspective view showing a connection between the center frame and the rear frame.

FIG. 15 is a first perspective view showing a connection between the center frame 13 and the rear frame 14. As shown, each of the left and right connecting brackets 83 comprises an inner bracket member 141 and an outer bracket member 142. More specifically, in each of the left and right side sections of the vehicle, the connecting frame member 82, rear upper frame member 111 and rear lower frame member 112 are held between the inner and outer bracket members 141 and 142 of the connecting brackets 83 and fastened together by means of not-shown bolts and nuts, and the inner and outer bracket members 141 and 142, rear upper frame member 111 and rear lower frame member 112 are fastened together by means of not-shown bolts and nuts. Reference numeral 145 represents a rear bracket secured to a rear side surface of the rear upper frame member 111, and this rear bracket 145 supports the upper end of the rear cushion unit that constitutes the rear wheel suspension.

Figure 16:
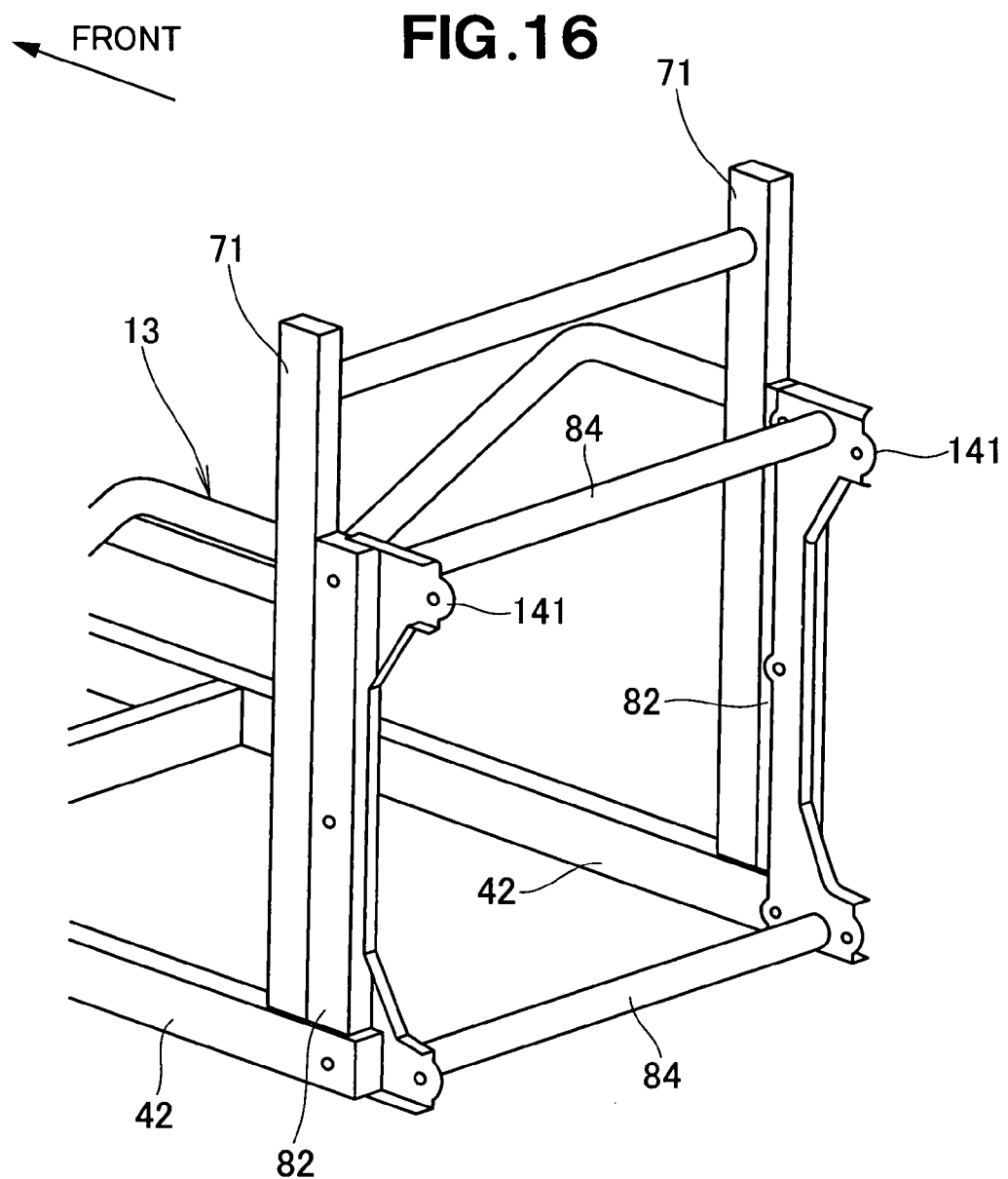
FIG. 16 is a second perspective view showing the connection between the center frame and the rear frame.

FIG. 16 is a second perspective view showing the connection between the center frame 13 and the rear frame 14, which particularly shows the center frame 13 with the rear frame 14 and outer bracket member 142 (see FIG. 15) removed therefrom. The inner and outer bracket members 141 and 142 are each provided by press-forming a plate material. The connecting frame member 82 is a hollow member of a rectangular cross-sectional shape secured to the rear surface of the center vertical frame member 71.

Figure 17:
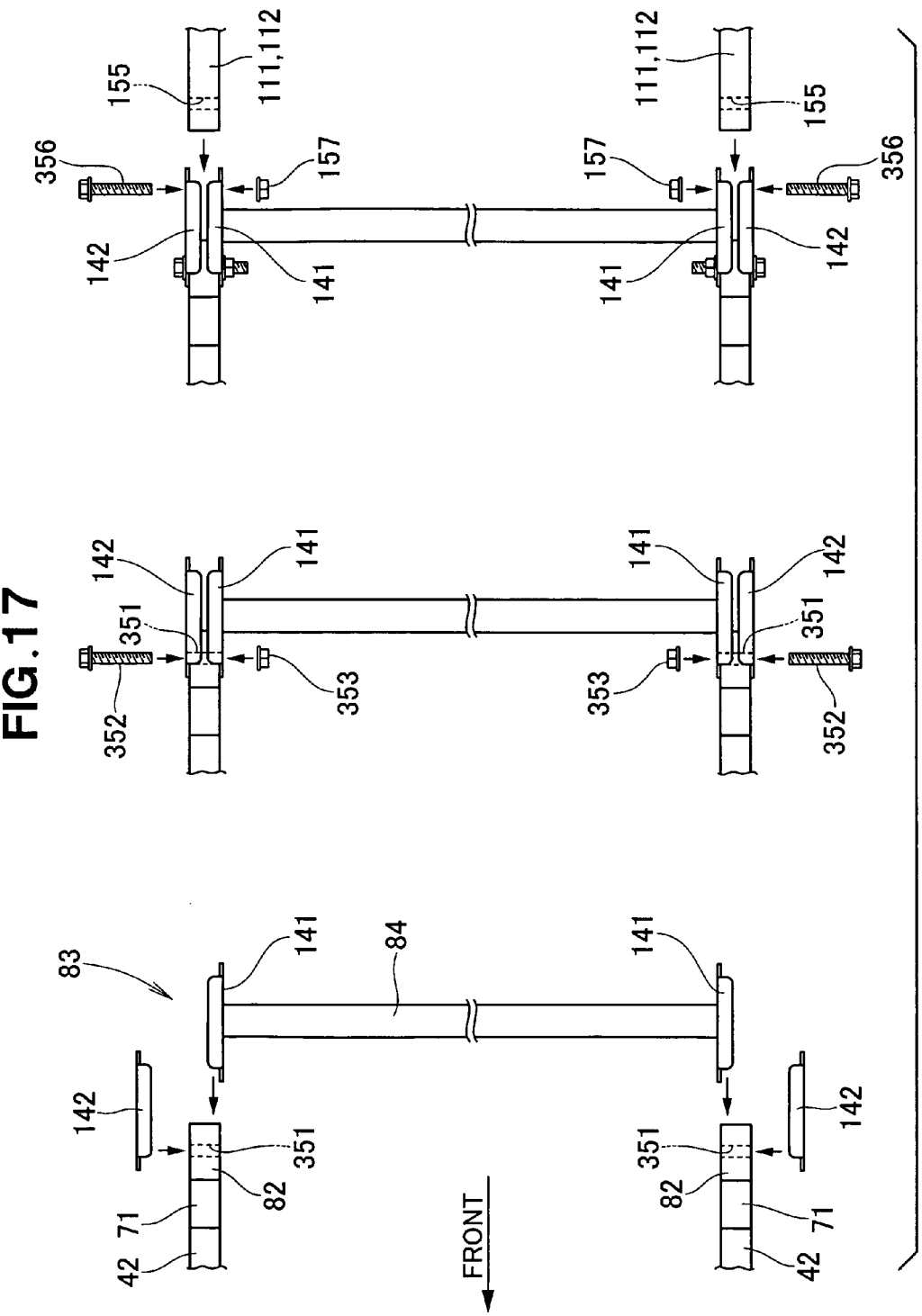
FIG. 17 is a view showing a manner in which the center frame and the rear frame are interconnected.

The following paragraphs describe a manner in which the center frame 13 and the rear frame 14 are interconnected. FIG. 17 is a view showing a manner in which the center frame 13 and the rear frame 14 are interconnected.

As seen in section (a) of FIG. 17, the left and right connecting frame members 82 each have a bolt insertion hole 351 previously formed therein. The left and right inner bracket members 141, interconnected via the fourth cross member 84, are inserted between the respective inner sides of the left and right connecting frame members 82 as indicated by leftward arrows, and then the left and right outer bracket members 142 are brought into contact with the outer side surfaces of the connecting frame members 82 as indicated by inward arrows.

Then, as seen in section (b) of FIG. 17, a bolt 352 is inserted, laterally inward from outside of each of the left and right connecting brackets 83, through a bolt insertion hole formed in the left or right outer bracket member 142, the above-mentioned bolt insertion hole 351 formed in the left or right connecting frame member 82 and then a bolt insertion hole formed in the left or right inner bracket member 141, and a nut 353 is screwed onto a distal or inner end portion of the bolt 352.

Then, as seen in section (c) of FIG. 17, each of the rear upper frame members 111 (and rear lower frame members 112), having a bolt insertion hole 155 previously formed therein, is inserted between the inner and outer bracket members 141 and 142. After that, a bolt 356 is inserted, laterally inward from outside of each of the left and right connecting brackets 83, through a bolt insertion hole formed in the left or right outer bracket member 142, the above-mentioned bolt insertion hole 155 formed in the left or right rear upper frame members 111 (and rear lower frame members 112) and then a bolt insertion hole formed in the left or right inner bracket member 141, and a nut 357 is screwed onto a distal end portion of the bolt 356. This complete the connection, to the center frame 13, of the rear frame 14.

Because the rear frame 14 is detachably attachable to the center frame 13 in the above-described manner, maintenance, such as repair and replacement, of the rear frame 14 can be greatly facilitated. Because the rear frame 14 can be readily replaced with another one of different specifications, the usability of the vehicle 10 can be enhanced.

Figure 18:
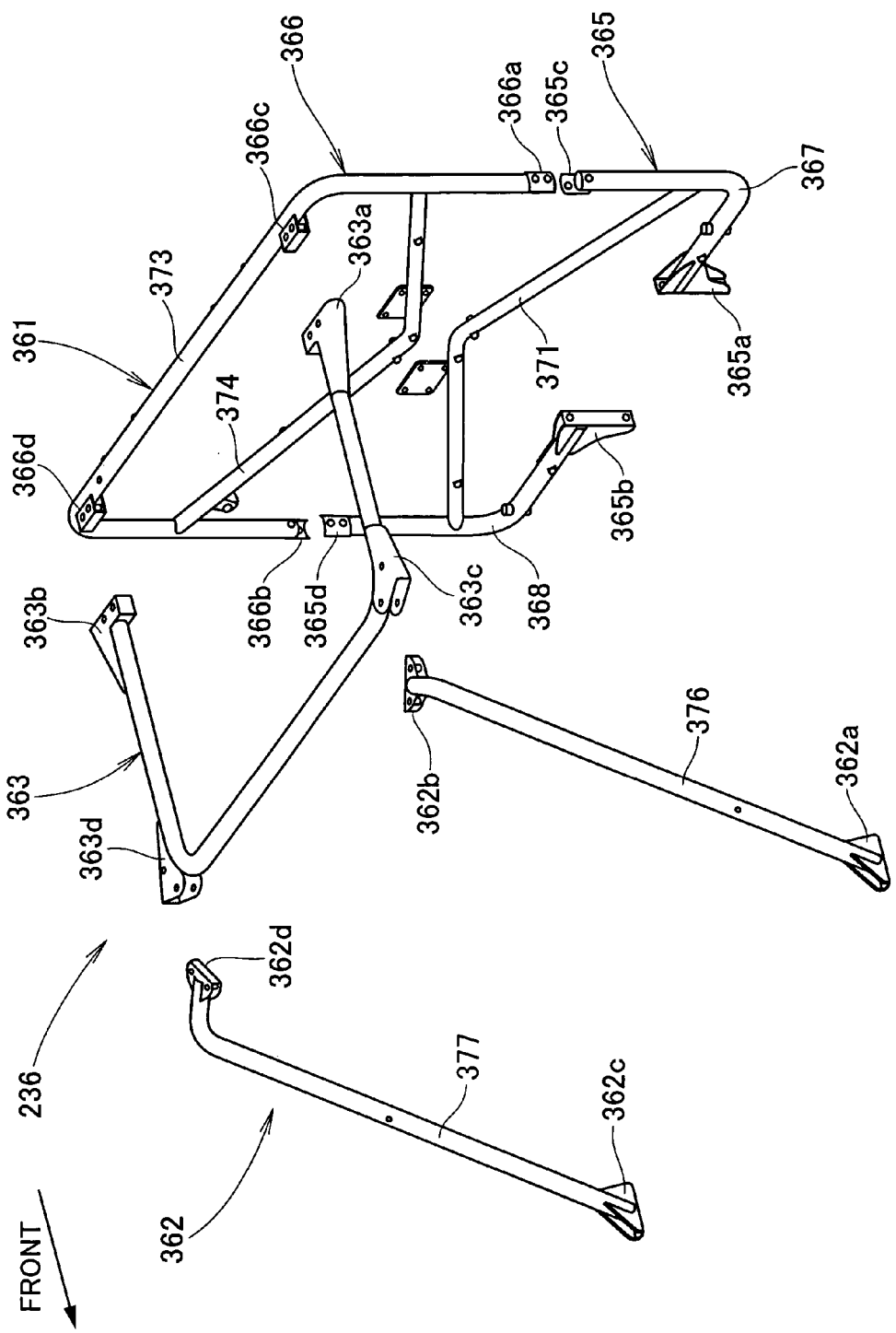
FIG. 18 is an exploded perspective view of a roll bar unit employed in the vehicle.

FIG. 18 is an exploded perspective view of the roll bar unit 236 employed in the vehicle. The roll bar unit 236 comprises a rear pipe 361 extending upward from a rear end portion of the center frame 13, a front pipe 362 extending upwardly and rearwardly from the front frame 12, and a generally C-shaped top pipe 363 secured to and extending between the rear pipe 361 and front pipe 362.

The rear pipe 361 includes a lower pipe member 365 secured to the left and right center vertical frame members 71, and an upper pipe member 366 secured to the upper ends of the lower pipe member 365.

The lower pipe member 365 includes left and right L-shaped pipe portions 367 and 368, a V-shaped pipe portion 371 secured to and extending between the left and right L-shaped pipe portions 367 and 368, connecting portions 365*a* and 365*b* for connection to the left and right center vertical frame members 71, and connecting portions 365*c* and 365*d* for connection to the upper pipe member 366.

The upper pipe member 366 includes a generally C-shaped pipe portion 373, a V-shaped pipe portion 374 secured to and extending between left and right vertical portions of the pipe portion 373, connecting portions 366*a* and 366b for connection to the connecting portions 365c and 365d of the lower pipe member 365, and connecting portions 366c and 366d for connection to the top pipe 363.

The front pipe 362 comprises linear left and right pipe members 376 and 377, and the left pipe member 376 includes a connecting portion 362a for connection to the left second front vertical frame member 54 (see FIG. 3) and a connecting portion 362b for connection to the top pipe 363. The right pipe member 377 includes a connecting portion 362c for connection to the right second front vertical frame member 54 and a connecting portion 362d for connection to the top pipe 363.

The generally C-shaped top pipe 363 has, at its opposite distal ends, connecting portions 363a and 363b for connection to the connecting portions 366c and 366d of the upper pipe member 366. The generally C-shaped top pipe 363 also has, at its opposite corners, connecting portions 363c and 363d for connection to the connecting portions 362c and 362d of the front pipe 362. Each of the above-mentioned connecting portions is connected to the corresponding connecting portion by means of a bolt and nut.

The above-described vehicle floor structure vehicle body frame structure of the present invention is particularly suited for use in four-wheeled vehicles.

Obviously, various minor changes and modifications of the present invention are possible in the light of the above teaching. It is therefore to be understood that within the scope of the appended claims the invention may be practiced otherwise than as specifically described.

What is claimed is:

1. A vehicle floor structure comprising:
   a front frame for supporting thereon a front wheel suspension and a steering member, said front frame including a front side frame and a vertical front frame member extending upward from said front side frame;
   a lower frame connected to a rear end portion of said front frame;
   a seat frame attached to said lower frame at an attachment location such that said seat frame rises above said lower frame for supporting thereon a seat;
   a foot-resting floor section provided above said lower frame;
   a subsidiary frame, provided between said vertical front frame member of said front frame and said seat frame and at a position higher than said lower frame, for supporting thereon said floor section, said subsidiary frame being attached to said seat frame at a vertical location above the attachment location; and
   a step support frame, provided alongside said lower frame, for supporting thereon a boarding step adjacent to an outer side edge of said floor section, whereby said floor section is located at a level higher than said boarding step.

2. A vehicle floor structure as claimed in claim 1 wherein said boarding step is provided at a substantially same level as said lower frame.

3. A vehicle floor structure as claimed in claim 1 wherein said boarding step extends from near a side edge of said floor section rearwardly beyond a rear end of the seat.

4. A vehicle floor structure as claimed in claim 1 wherein a storage space is provided between said subsidiary frame and said lower frame.

* * * * *